United States Patent
Okajima et al.

(10) Patent No.: US 6,843,908 B2
(45) Date of Patent: Jan. 18, 2005

(54) MULTISTAGE IMMERSION TYPE MEMBRANE SEPARATOR AND HIGH-CONCENTRATION WASTEWATER TREATMENT FACILITY USING SAME

(75) Inventors: Yasunobu Okajima, Osaka (JP); Tatsuya Uejima, Osaka (JP); Masaaki Nagano, Osaka (JP); Kiyoshi Izumi, Osaka (JP); Yutaka Yamada, Osaka (JP); Taichi Uesaka, Osaka (JP)

(73) Assignee: Kubota Corporation (JP)

( * ) Notice: Subject to any disclaimer, the term of this patent is extended or adjusted under 35 U.S.C. 154(b) by 133 days.

(21) Appl. No.: 10/182,636

(22) PCT Filed: Nov. 30, 2001

(86) PCT No.: PCT/JP01/10524

§ 371 (c)(1),
(2), (4) Date: Jul. 22, 2002

(87) PCT Pub. No.: WO02/45827

PCT Pub. Date: Jun. 13, 2002

(65) Prior Publication Data

US 2003/0010690 A1 Jan. 16, 2003

(30) Foreign Application Priority Data

Dec. 4, 2000 (JP) .................................... 2000-367855
Dec. 22, 2000 (JP) .................................... 2000-389657
Dec. 22, 2000 (JP) .................................... 2000-389658
Sep. 4, 2001 (JP) .................................... 2001-266588

(51) Int. Cl.[7] .......................... B01D 61/18; B01D 65/08
(52) U.S. Cl. ...................... 210/151; 210/201; 210/203; 210/220; 210/321.69; 210/321.75; 210/346
(58) Field of Search ................................ 210/151, 231, 210/201, 203, 220, 346, 321.84, 321.75, 221.2, 321.69

(56) References Cited

U.S. PATENT DOCUMENTS

6,284,135 B1 * 9/2001 Ookata ........................ 210/220

FOREIGN PATENT DOCUMENTS

| EP | 0 662 341 A1 | 7/1995 | |
|---|---|---|---|
| JP | 56013087 A | 2/1981 | |
| JP | 58-141796 | 8/1983 | |
| JP | 63077525 A * | 4/1988 | ............. B01F/3/04 |
| JP | 64-36099 | 3/1989 | |
| JP | 07171587 A * | 7/1995 | ............. C02F/3/06 |
| JP | 08141587 A * | 6/1996 | ............. C02F/3/06 |
| JP | 10-235390 | 9/1998 | |
| JP | 11-244674 | 9/1999 | |
| JP | 2000-61273 | 2/2000 | |
| WO | WO 99/29401 | 6/1999 | |
| WO | WO00/09245 | 2/2000 | |

* cited by examiner

Primary Examiner—Terry K. Cecil
(74) Attorney, Agent, or Firm—Kusner & Jaffe

(57) ABSTRACT

A multistage immersion type membrane separator in which an air diffuser is disposed under a filtration part immersed in a treatment tank, characterized in that: the filtration part has plural plate-like membrane cartridges arranged in a vertically parallel multistage fashion at spaced intervals for forming a crossflow passage of a predetermined width; and that the air diffuser has a diffuser tube disposed sidewardly that is communicated at its basal end to an air supply source and has at its lower side part plural blowholes, a flushing pipe that is communicated at its basal end to the tip of the diffuser tube and has at its tip an opening serving as an outlet above the diffuser tube, and a flushing valve disposed in the flushing pipe.

9 Claims, 27 Drawing Sheets

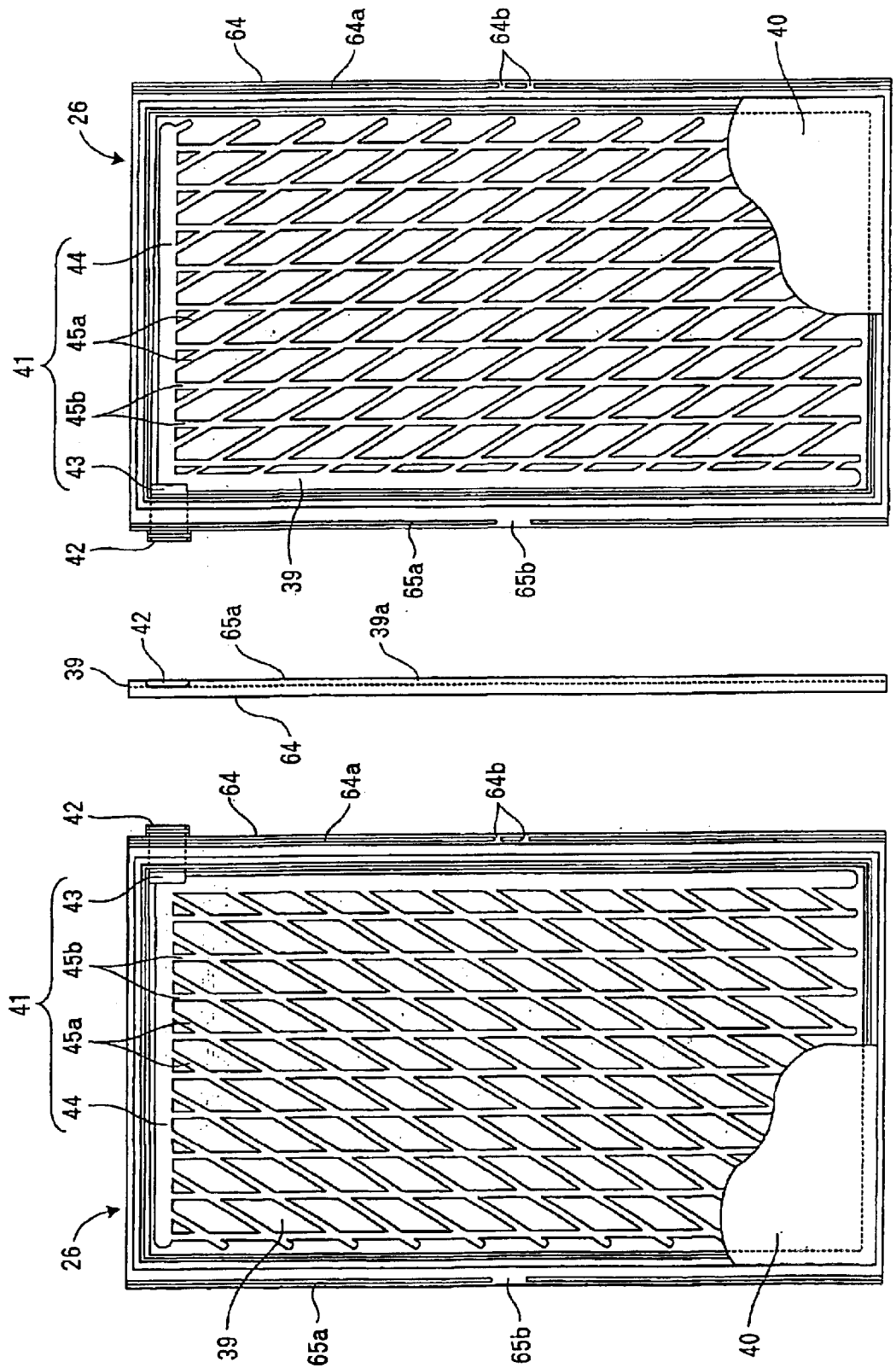

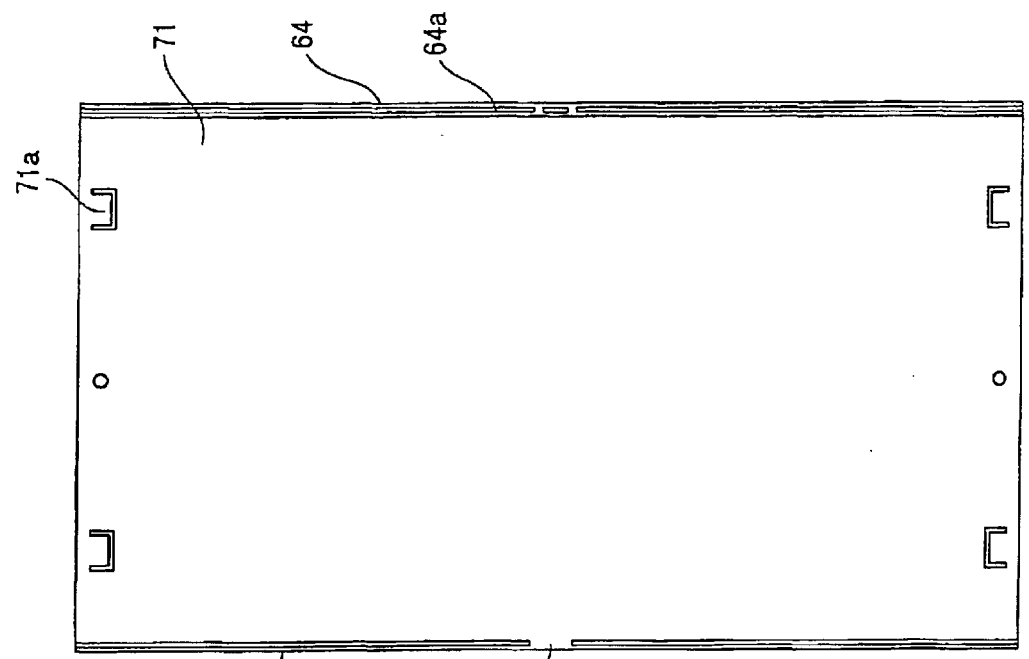
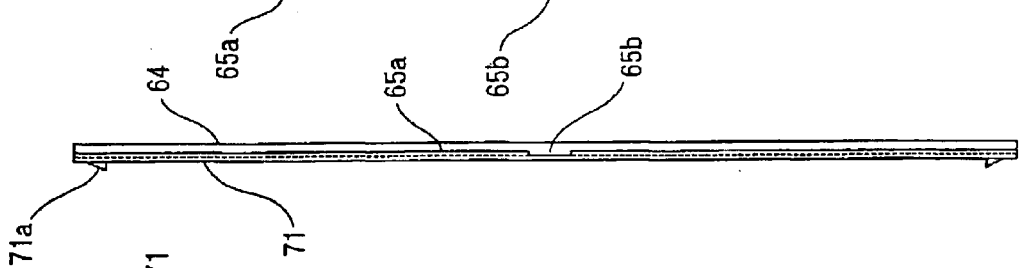
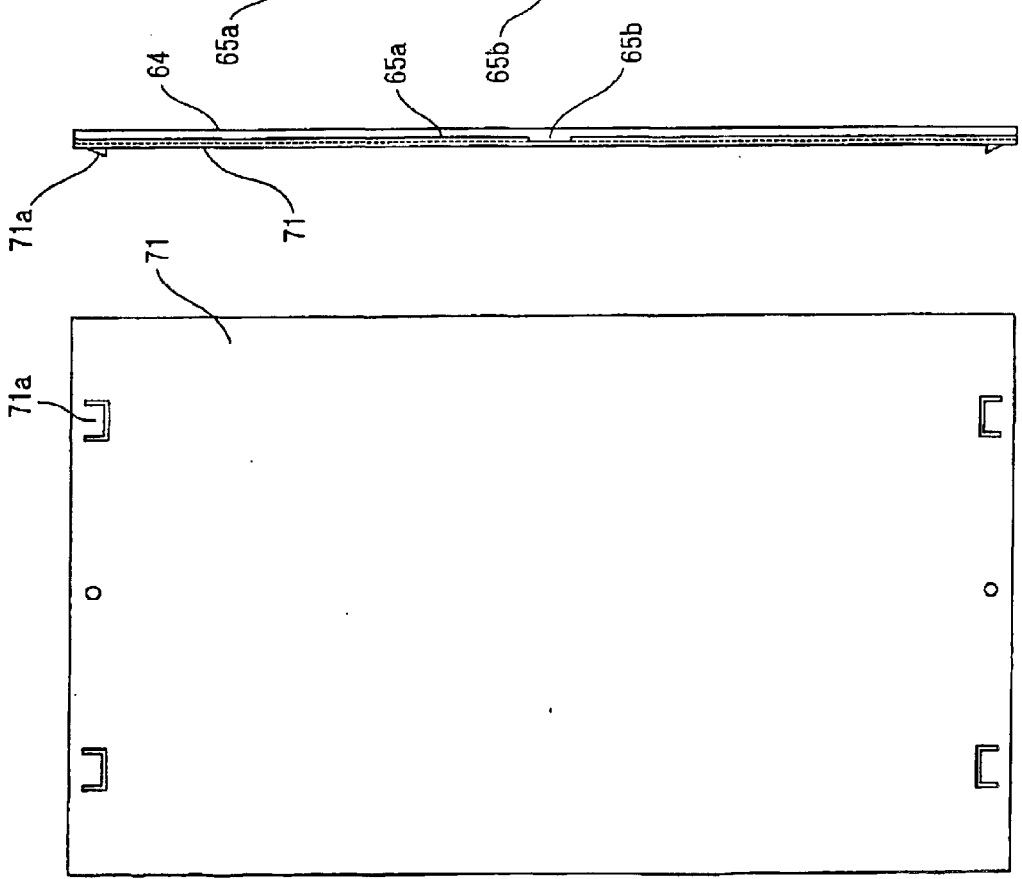

F I G. 2 6
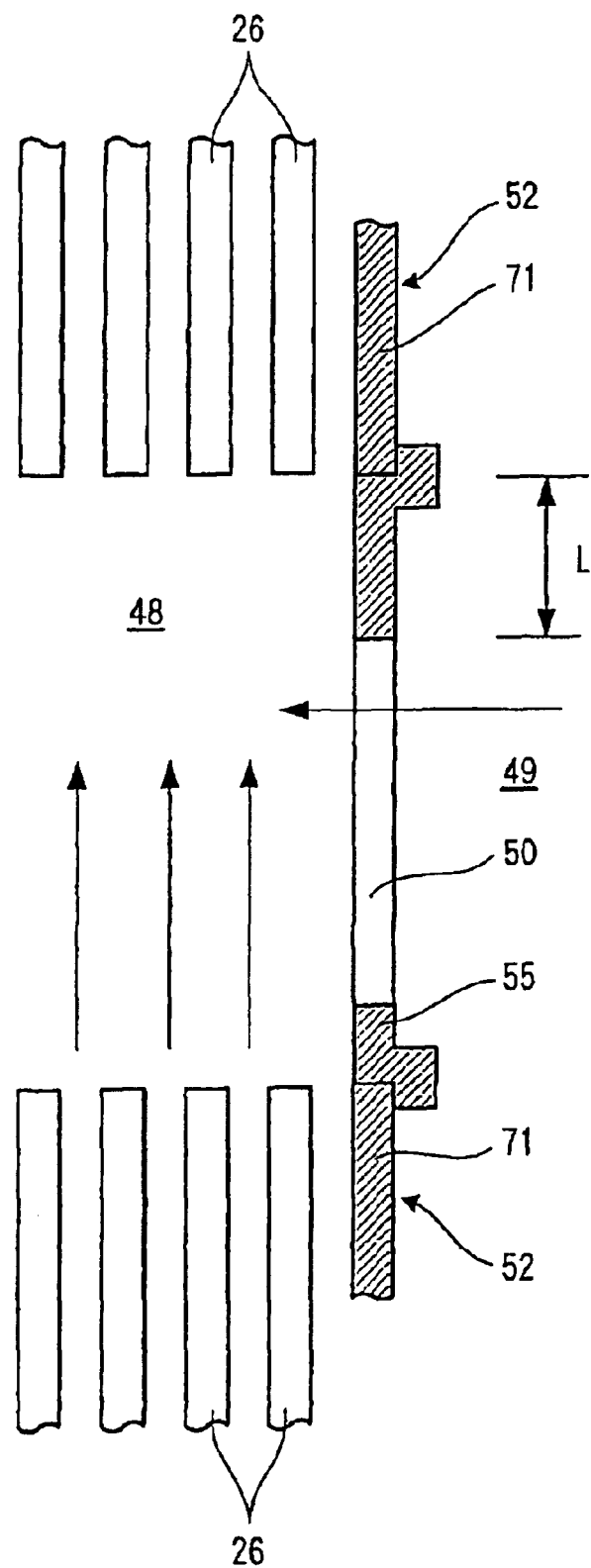

PRIOR ART

MULTISTAGE IMMERSION TYPE MEMBRANE SEPARATOR AND HIGH-CONCENTRATION WASTEWATER TREATMENT FACILITY USING SAME

TECHNICAL FIELD

The present invention relates to a multistage immersion type membrane separator and a high-concentration wastewater treatment facility using the same. More particularly, the invention relates to a membrane separation technique of performing wastewater treatment and sludge concentration by using a plate-like membrane cartridge, as well as a technique of performing activated sludge process of organic wastewater that is high in organic concentration and nitrogen concentration by using a multistage immersion type membrane separator.

BACKGROUND ART

Referring to FIG. 33, in a conventional immersion type membrane separator 1, a casing 2 is made up of a membrane case 3 and diffuser case 4. In the membrane case 3, a plurality of plate-like membrane cartridges 5 are so arranged that their membrane surfaces stand vertically at predetermined spaced intervals (usually, 6 mm to 10 mm). An air diffuser 6 is disposed in the diffuser case 4. In the plate-like membrane cartridge 5, a filtration membrane is attached to the front and rear surfaces of a filter supporting plate having rigidity, which is for example made of resin, and each filtration membrane is fused at its peripheral portion to the filter supporting plate by heating with a heater or by ultrasonic vibration. For example, the air diffuser 6 is obtained only by boring a plurality of blowholes of approximately φ10 mm in a lower part of a pipe made of vinyl chloride.

In the immersion type membrane separator 1, the air diffusing from the air diffuser 6 produces an upstream. An intra-tank mixed liquor in a treatment tank is supplied to a passage between adjacent plate-like membrane cartridges 5 by crossflow along the membrane surfaces and then subjected to crossflow filtration by the plate-like membrane cartridges 5. Permeated water that has been permeated through the filtration membranes is discharged to the outside of the tank via a tube 7 and collecting pipe 8.

Since an individual plate-like membrane cartridge 5 and collecting pipe 8 are connected via the tube 7 in the immersion type membrane separator 1, a large number of tubes 7 are present in the flow of the upstream, which constitute an obstruction to the flow.

On the other hand, during a period of time that the operation of the air diffuser is stopped, sludge enters a diffuser tube through the blowholes. This sludge is dried with air during air diffusion operation, and the dried sludge causes clogging of the blowholes and diffuser pipes. Clogging of some blowholes of the air diffuser 6 makes the upstream non-uniform, and some of the filtration membranes 5 fail to sufficiently receive membrane surface flushing effect. To prevent this, it is necessary to flush the air diffuser 6 in a periodic maintenance. This flushing is usually performed one time for two weeks. Letting water in the diffuser tube of the air diffuser 6 flushes the diffuser tube.

In the meantime, activated sludge process is employed as a method of treating organic wastewater having high organic and nitrogen concentrations. To maintain high activated sludge concentration in the tank, membrane separation activated sludge process using a membrane separator is employed, for example.

Referring to FIG. 32, in a water treatment system performing a general membrane separation activated sludge process, sundry matter is firstly removed from ale wastewater in a preprocessing facility 11 and then stored in a flow control tank 12. This is next supplied to a bioremediation tank (aeration tank) 13 at a fixed flow rate. In the bioremediation tank 13, organic materials in the wastewater is decomposed and removed by activated sludge. Then the resulting matter is subjected to liquid-solid separation in an immersion type membrane separator 14 immersed in the bioremediation tank 13, and then transferred to a sterilizing tank 16, through which the filtrate is discharged.

In this membrane separation activated sludge process, plate-like membrane cartridges 15 of the immersion type membrane separator 14 are disposed in a vertical multistage fashion in order to reduce the installation space of the bioremediation tank 13, thereby increasing the efficiency of filling of the membranes in the unit volume of the bioremediation tank 13. The basic construction of the immersion type membrane separator 14 and plate-like membrane cartridges 15 are the same as that in FIG. 33, and thus their description is omitted here.

Only liquid content of the intra-tank mixed liquor passing through the immersion type membrane separator 14 is removed by filtration, and the concentration of sludge is elevated. Therefore, the passage between the adjacent plate-like membrane cartridges 15 is located higher, the sludge concentration of the intra-tank mixed liquor is increased. This increases the filtration resistance of the intra-tank mixed liquor, and thus the passage between the membrane cartridges 15 may be clogged in some cases. Further, due to a reduction of the moisture content, the flow rate of the intra-tank mixed liquor decreases as the passage is located higher. As a result, the current velocity of the crossflow of the intra-tank mixed liquor passing between the plate-like membrane cartridges 15 is lowered and thus the membrane flushing effect is lowered.

When the amount of treatment is increased by arranging the plate-like membrane cartridges 15 of the immersion type membrane separator 14 in a vertical multistage fashion, the oxygen demand necessary for bioremediation in the tank 13 is increased to cause a deficiency of oxygen. Particularly, denitrification process requires a large oxygen demand. However, the air quantity diffused in the immersion type membrane separator 14 is limited, and thus excess air supply may lead to a drop in the efficiency of filtration, as well as damage to the membranes.

It is an object of the invention to overcome the foregoing problem by providing a multistage immersion type membrane separator capable of effecting a reliable production of crossflow and efficient filtration operation in such a construction of arranging plate-like membrane cartridges in a vertical multistage fashion, and a high-concentration wastewater treatment facility capable of effecting a sufficient oxygen supply when a multistage immersion type membrane separator is used in membrane separation activated sludge process.

DISCLOSURE OF THE INVENTION

The above mentioned problem is solved according to a first aspect of the invention by a multistage immersion type membrane separator in which an air diffuser is disposed below a filtration part immersed in a treatment tank, characterized in that:

the filtration part has plural plate-like membrane cartridges arranged in a vertically parallel multistage fashion and spaced at intervals for forming a crossflow passage of a predetermined width;

the plate-like membrane cartridges have a filter supporting plate having rigidity on which a permeated water passage is formed, filtration membranes attached to the front and rear of the filter supporting plate, and a permeated water outlet disposed at an upper portion one side end surface of the filter supporting plate such that it is communicated to the permeated water passage and connected to a collecting means;

the permeated water passage has a collecting hole extending from the front to rear of the filter supporting plate and being communicated to the permeated water outlet, a collecting passage formed in a groove having a predetermined width in an upper part and one side part of the front and rear surfaces of the filter supporting plate such that it is communicated at one end to the collecting hole, and plural sloped conduits sloping ax a predetermined angle to a vertical direction with respect to the front and rear surfaces or the filter supporting plate, the sloped conduits being communicated at their upper end to the collecting passage by arranging such that their upper end is closer to the collecting hole than their lower end; and the air diffuser has a diffuser tube disposed sidewardly that is communicated at its basal end to an air supply source and has at its lower side part plural blowholes, a flushing pipe that is communicated at its basal end to the tip of the diffuser tube and has at its tip an opening serving as an outlet above the diffuser tube, and a flushing valve disposed in the flushing pipe.

With this construction, during usual air diffusion operation, the flushing valve is closed so that the air to be supplied from the air supply source to the air diffuser at a predetermined pressure is blown off from the blowholes of the diffuser tube. This air aerates the intra-tank mixed liquor and supplies oxygen for bioremediation. This air also produces an upstream by air lift action, thereby stifling the intra-tank mixed liquor. The upstream is joined with the surrounding intra-tank mixed liquor to form an air-liquid-solid mixed phase stream. This stream is then subjected to membrane separation when passing through the crossflow passages between the pate-like membrane cartridges at the lowermost stage. Thereafter, the air-liquid-solid mixed phase stream successively flows to the crossflow passage between the upper plate-like membrane cartridges for membrane separation. At the same time, the upstream functions as traction that flushes the membrane surfaces of die plate-like membrane cartridges.

After transmitting through the respective membrane surfaces of the plate-like membrane cartridges, the permeated water passes through the sloped conduits to the collecting passage, then flows to the permeated water outlet via the collecting hole. At this time, directing the permeated water to the collecting passage wider than the sloped conduit increases the drainage property on the filter support plate surfaces. Also, directing the permeated water to the sloped conduit for a smooth flow to the permeated water outlet, suppresses the back pressure of the permeated water passage, thereby increasing filtration action under the differential pressure between membranes. Since an individual plate-like membrane cartridge is connected to the collecting means in the permeated water outlet disposed on the side end surfaces of the filter supporting plate, any member (e.g., tube,) which constitutes an obstruction to the upstream, is not present in an upper region of the plate-like membrane cartridge. This allows the upstream to smoothly pass through the passage between membranes.

During flushing operation, the flushing valve is opened so that the air to be supplied from the air supply source is discharged from the outlet via the flushing pipe under atmospheric pressure or a predetermined depth.

When the outlet is opened under atmospheric pressure or the predetermined depth, the pressure within the diffuser tube is lowered and the back pressure in the outlet corresponds to the atmospheric pressure or the predetermined depth pressure. It follows that the back pressure of the blowholes locating below the outlet is greater than the back pressure of the outlet. As a result, the air within the diffuser tube flows to the outlet, and the intra-tank mixed liquor flows from the blowholes to the diffuser tube that is low in pressure. The intra-tank mixed liquor running in the diffuser tube is joined with air to pass through the diffuser tube while flushing the diffuser tube. This intra-tank mixed liquor is then joined with sludge within the diffuser tube to enter the flushing pipe and come off together form the outlet by air lift action.

To the inner surface of the diffuser tube, sludge is attached which enters the diffuser tube when the operation of the air diffuser is stopped, and which is then dried by the air passing through the diffuser tube during air diffusion. Infiltration of the intra-tank mixed liquor facilitates the release of the dry sludge from the inner surface of the diffuser tube. The released sludge is joined with the intra-tank mixed liquor to come off together from the outlet as the air is discharged.

In the foregoing operation, when the intra-tank mixed liquor rapidly runs in the diffuser tube that is low in pressure via the blowholes, the resistance of the intra-tank mixed liquor increases the pressure within the diffuser tube to stop the flow of the intra-tank mixed liquor into the diffuser tube. When the intra-tank mixed liquor running in the diffuser tube flows to the flushing pipe and then discharged from the outlet by air lift action, the pressure within the diffuser tube is again lowered and the intra-tank nixed liquor runs in the diffuser tube via the blowholes. The result of this is that pulsation occurs in the diffuser tube and the flushing pipe.

At the occurrence of pulsation, the pressure within the diffuser tube varies with repeated subjection to sharp increase and decrease. This produces intermittent occurrences of a flushing state that the intra-tank mixed liquor flows to the diffuser tube via the blowhole, and an air diffusion state that the flow of the intra-tank mixed liquor into the diffuser tube is stopped and part of the air blows off via the blowholes. At the point that the air diffusion state changes to the flushing state, a rapid flow of the intra-tank mixed liquor occurs in the diffuser tube. Repeated occurrences of the rapid flow increases the effect of flushing the sludge attached to the inside of the diffuser tube.

A multistage immersion type membrane separator according to-a second aspect of the invention is characterized in that the filtration part has an open space between vertically adjacent plate-like membrane cartridges, and that there is an inlet communicated to the open space and its surrounding intra-tank region.

With this construction, the intra-tank mixed liquor moves upward in the filtration part so that the pressure within the filtration pail is lower than that of the surrounding intra-tank region and the surrounding intra-tank mixed liquor runs in the open space via the inlet. Therefore, when the air-liquid-solid mixed phase stream passes through the open space, it is joined with the intra-tank mixed liquor running in the open space via the inlet, to flow to the crossflow passage between the upper plate-like membrane cartridges.

Consequently, the intra-tank mixed liquor from the inlet compensates for a reduction in the flow due to the membrane separation action of the lower plate-like membrane cartridges, and also dilutes the sludge concentration that has been increased in the crossflow passage between the lower plate-like membrane cartridges. These functions stabilize the sludge concentration of the intra-tank mixed liquor passing through the crossflow passage between the respective plate-like membrane cartridges at every stage, as well as the current velocity of the crossflow. This ensures a sufficient membrane surface flushing to avoid clogging between membranes.

A multistage immersion type membrane separator according to a third aspect of the invention is characterized in that the filtration part has a skirt of a predetermined length surrounding a lower region of the plural plate-like membrane cartridges arranged in parallel, and that there is an inlet under the skirt.

With this construction, the skirt suppresses bubbles being ejected to the exterior when the upstream after passing through the open space flows to the crossflow passage between the upper plate-like membrane cartridges.

A multistage immersion type membrane separator according to a fourth aspect of the invention is characterized in that the filtration part has plural filtration units arranged in a vertical multistage fashion, each unit having in its inner part a plurality of plate-like membrane cartridges arranged in parallel and spaced at predetermined intervals between their respective membrane surfaces.

With this construction, the upstream produced by the air lift action of the air blowing off from the blowholes of the air diffuser during normal operation is subjected to membrane separation when passing through the lowermost filtration unit, and then successively flows to the upper filtration unit for membrane separation.

A multistage immersion type membrane separator according to a fifth aspect of the invention is characterized in that the filtration part has plural filtration units disposed in a vertical multistage fashion, each of which is made up of plural plate-like membrane cartridges arranged in parallel and spaced at predetermined intervals, each plate-like membrane cartridge having, at a side edge portion of a filter supporting plate, a wall piece portion that makes contact with the side edge portion of the adjacent plate-like membrane cartridge to close a side opening of a crossflow passage.

With this construction, between the filter supporting plates of the adjacent plate-like membrane cartridges, the wall piece portion of one filter supporting plate makes contact with the side edge portion of the other filter supporting plate. In this way, the side edge surfaces and the wall piece portions in the plate-like membrane cartridges are continuous with each other, thereby forming a wall part of the filtration unit. Thus, since each plate-like membrane cartridge forms a portion of the wall part of the filtration unit, there is no need for case that covers entirely the paralleled plural plate-like membrane cartridges.

A multistage immersion type membrane separator according to a sixth aspect of the invention is characterized in that the diffuser tube is made up of a main pipe communicated at its basal end to an air supply source and communicated at its tip to a flushing pipe, and plural branch pipes being communicated to the main pipe and being opened at their tip as a blowhole, below the main pipe.

With this construction, during air diffusion operation, the air supplied to the diffuser tube flows from the main pipe to the branch pipes and then blows off from the blowholes at the tip of the branch pipes. During flushing operation, the intra-tank mixed liquor runs in the branch pipes via the blowholes. This intra-tank mixed liquor is joined with air to pass through the branch pipes to the main pipe while flushing the inside of the diffuser tube, and then joined with cumulus deposit within the diffuser tube to come off together from the outlet via the flushing pipe.

Since the openings at the tip of the branch pipes serve as the blowhole, the inner diameter of the branch pipes and the aperture of the blowholes are the same. This provides such a shape that has no variations in the sectional area of the passage, and thus there is no resistance to obstruct the fluid flowing from the inside of the branch pipes via the blowholes to the exterior. Therefore, the sludge and intra-tank mixed liquor that remain in the branch pipes when changing from the flushing state to the air diffusion state, are quickly discharged to the outside of the branch pipes during air diffusion. Otherwise, the resulting effects are the same as the first aspect.

A multistage immersion type membrane separator according to a seventh aspect of the invention is characterized in that the diffuser tube is made up of a main pipe communicated at its basal end to an air supply source and communicated at its tip to a flushing pipe, and plural branch pipes being communicated to the main pipe and having at their upper side a plurality of blowholes of which diameter is smaller than an opening at their tip.

With this construction, during air diffusion operation, the air supplied to the diffuser tube flows from the main pipe to the branch pipes and then blows off from the blowholes of the branch pipes. The air passing through the branch pipes receives buoyancy due to a density difference with the intra-tank mixed liquor, and therefore, blows off from the blowholes. At this time, the blowholes of the small aperture produce small-diameter air bubbles, thereby increasing the efficiency of dissolution of oxygen. In addition, even if the blowholes are spontaneously clogged by sundry matter, sludge of low flowability, large flock and the like, the air blowing off from the openings at the tip of the branch pipes ensures a predetermined amount of air for aeration. Otherwise, the resulting effects are the same as the first aspect.

A high-concentration wastewater treatment facility using a multistage immersion type membrane separator according to an eighth aspect of the invention comprises the multistage immersion type membrane separator according to one of the first to seventh aspects, a treatment tank for performing bioremediation of organic wastewater having high organic concentration and high nitrogen concentration, a partition wall for dividing an intra-tank region of the treatment tank into a bioremediation region to which wastewater flows, and a membrane separation region in which the multistage immersion type membrane separator is immersed, and a liquor transfer means for transferring an activated sludge mixed liquor from the bioremediation region to the membrane separation region, the membrane separation region having a first air diffuser contained in the multistage immersion type membrane separator, the bioremediation region having a second air diffuser.

With this construction, the high-concentration organic wastewater running in the bioremediation region of the treatment tank is subjected to activated sludge process while supplying oxygen from the air diffused from the second air diffuser. The activate sludge mixed liquor to be transferred from the bioremediation region to the membrane separation region by the liquor transfer means is subjected to activated sludge process while supplying oxygen from the air diffused from the first air diffuser, then subjected to liquid-solid separation in the multistage immersion type membrane separator, followed by discharge of the transmitted liquor to the outside of the tank.

Thus, the use of the multistage immersion type membrane separator ensures a large amount of treatment under the limited volume of the treatment tank. In addition, an arbitrary amount of air can be supplied to the treatment tank by independently controlling the amount of air diffused from the second air diffuser while maintaining the amount of air diffused from the first air diffuser at a predetermined amount suitable for flushing the membrane surfaces of the multistage immersion type membrane separator. This ensures a sufficient supply of oxygen necessary for the activated sludge process of the high-concentration organic wastewater running in the treatment tank.

A high-concentration wastewater treatment facility using a multistage immersion type membrane separator according to a ninth aspect of the invention further comprises a second partition wall for dividing the bioremediation region of the treatment tank into a front denitrification region and a rear nitrification region, a second liquor transfer means for transferring an activated sludge mixed liquor from the denitrification region to the nitrification region, and a third liquor transfer means for transferring an activated sludge mixed liquor from the membrane separation region to the denitrification region.

With this construction, by the third liquor transfer means, the concentrated sludge of the membrane separation region is returned as a nitrification liquor to the denitrification region for performing denitrification process. At this time, the air quantity diffused from the first air diffuser is maintained at a predetermined quantity suitable for flushing the membrane surfaces of the multistage immersion type membrane separator, while the air quantity diffused from the second air diffuser is independently controlled to supply an arbitrary air quantity to the nitrification region, thereby ensuring a sufficient oxygen necessary for nitrification.

These and other objects, features, aspects and advantages of the present invention will become more apparent from the following detailed description of the present invention when taken in conjunction with the accompanying drawings.

BRIEF DESCRIPTION OF DRAWINGS

FIGS. 16(A), 16(B), and 16(C) are a front view, side view, and rear view of the plate-like membrane cartridge in FIG. 14, respectively;

FIGS. 18(A), 18(B), and 18(C) are a front view, side view, and rear view, respectively, which illustrate a side cover of the multistage immersion type membrane separator in FIG. 11;

FIG. 26 is an enlarged view showing an important part of the multistage immersion type membrane separator in FIG. 25;

BEST MODE FOR CARRYING OUT THE INVENTION

First Preferred Embodiment

Figure 1:
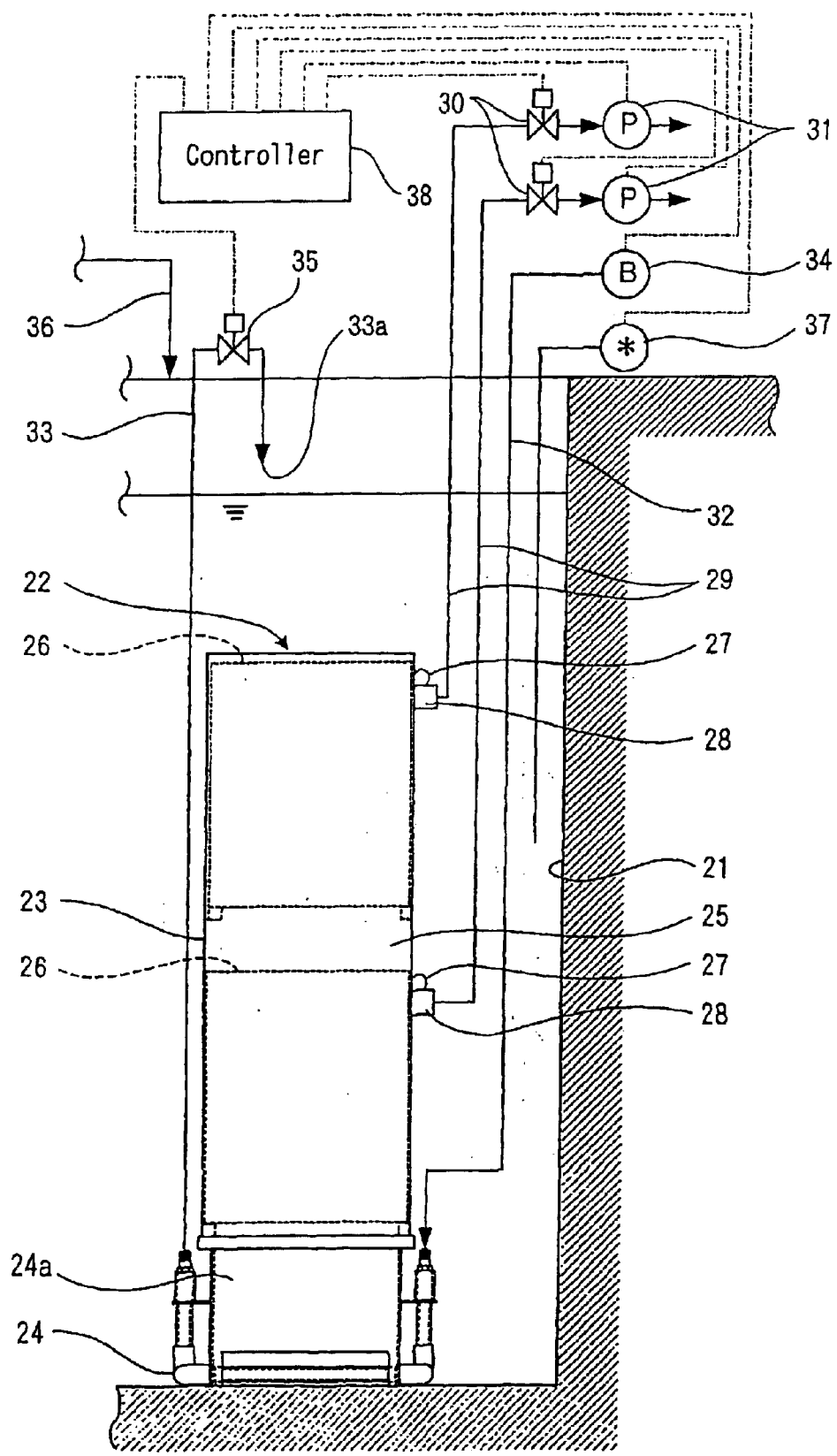
FIG. 1 is an overall front view of a multistage immersion type membrane separator according to one preferred embodiment of the invention.

A first preferred embodiment will be described below based on FIGS. 1 to 5. Referring to FIG. 1, a treatment tank 21 is to biologically treat sewage water, waste water, etc, and a multistage immersion type membrane separator 22 is immersed therein. The membrane separator 22 has a filtration part 23 and an air diffuser 24 disposed below the filtration part 23. In the filtration part 23, a plurality of plate-like membrane cartridges 26 are disposed vertically in the interior of a casing 25 opening at its top and bottom. The membrane cartridges 26 are arranged in a vertical multistage fashion in which these are disposed in parallel and spaced at intervals for forming a crossflow passage having a predetermined width.

At every stage, an individual plate-like membrane cartridge 26 is connected to a collecting part 28 via a tube 27. A collecting means are formed by the collecting part 28, a suction pipe 29 connected to the collecting part 28, and a suction pump 31 connected to the suction pipe 29 via an open/close valve 30.

An air supply pipe 32 and flushing pipe 33 are connected to the air diffuser 24, and the air supply pipe 32 is connected to a blower 34. The flushing pipe 33 is opened at its tip as an outlet 33a under atmospheric pressure (which can be opened under a predetermined depth), and a flushing valve 35 is disposed in the flushing pipe 33. A raw water supply pipe 36 is connected to and a water level gage is attached to the treatment tank 21.

Although each open/close valve 30, each suction pump 31, blower 34, and flushing valve 35 can be controlled by manual operation, a controller 38 controls these components in this preferred embodiment.

Figure 2:
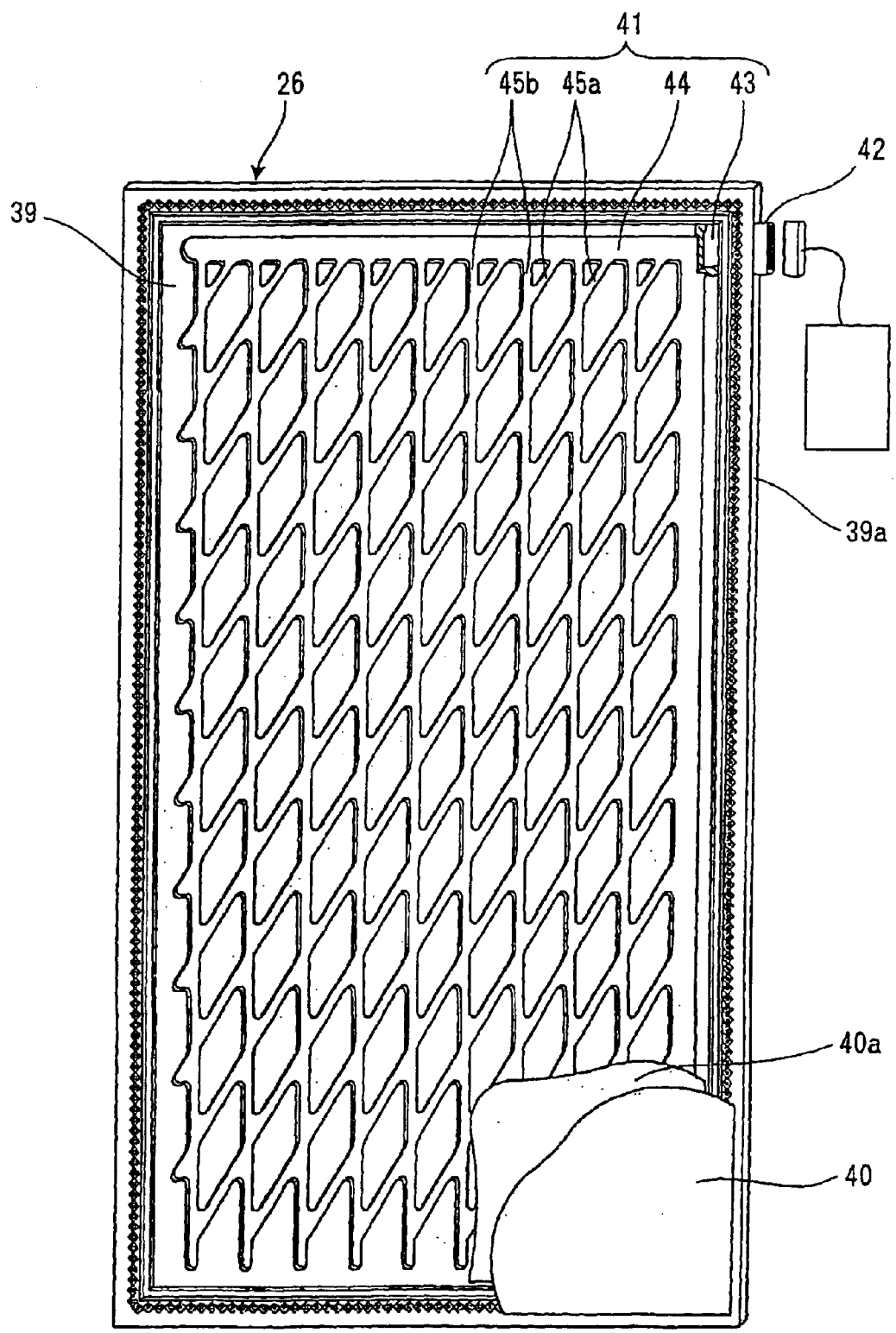
FIG. 2 is a perspective view of a plate-like membrane cartridge of the multistage immersion type membrane separator in FIG. 1.

Referring to FIG. 2, in the plate-like membrane cartridge 26, a filtration membrane 40 is attached via a spacer 40a to the front and rear surfaces of a filter supporting plate 39 made of material having rigidity (e.g., resin), and the peripheral portions of the filtration membranes 40 are fused to the filter supporting plate 39. The filter supporting plate 39 has a permeated water passage 41 through which the water passing through the filtration membranes 40 flows. A permeated water outlet 42 communicated to the permeated water passage 41 is disposed at an upper portion of one side surface 39a of the filter supporting plate 39. The permeated water 42 is connected to the collecting part 28 via the tube 27.

The permeated water passage 41 is formed by a collecting hole 43. plural collecting passages 44, plural sloped conduits 45a, and plural longitudinal conduits 45b. The collecting hole 43 extend from the front to rear of the filter supporting plate 39 and is communicated to the permeated water outlet 42. The collecting passages 44 are formed in the shape of a groove having a predetermined width in an upper part and one side part on the front and rear surfaces of the filter supporting plate 39, and are communicated at their one end to the collecting bole 43. The sloped conduits 45a are sloped at a predetermined angle to a vertical direction with respect to the front and rear surfaces of the filter supporting plate 39, and are communicated at their upper end to the collecting passage 44 by arranging such that their upper end is closer to the collecting hole 43 than their lower end. The longitudinal conduits 45b are formed in a vertical direction on the front and rear surfaces of the filter supporting plate 39 and are communicated at their upper end to the collecting passage 45.

Figure 3:
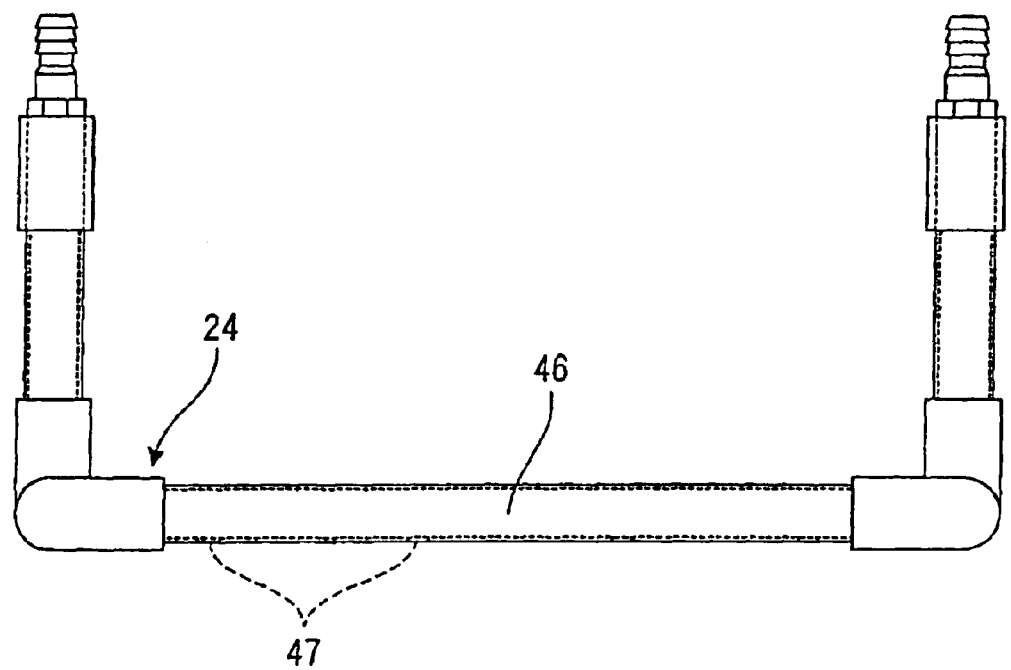
FIG. 3 is a front view of an air diffuser of the multistage immersion type membrane separator.
Figure 4:
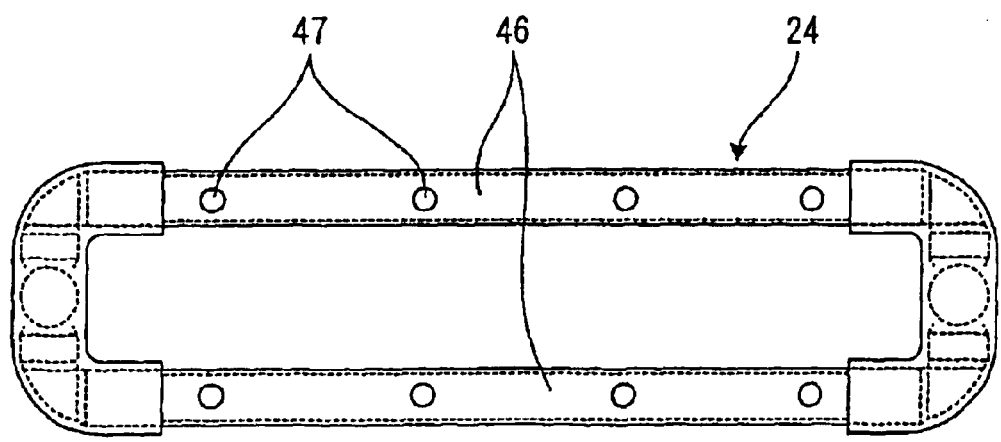
FIG. 4 is a bottom view of the air diffuser.
Figure 5:
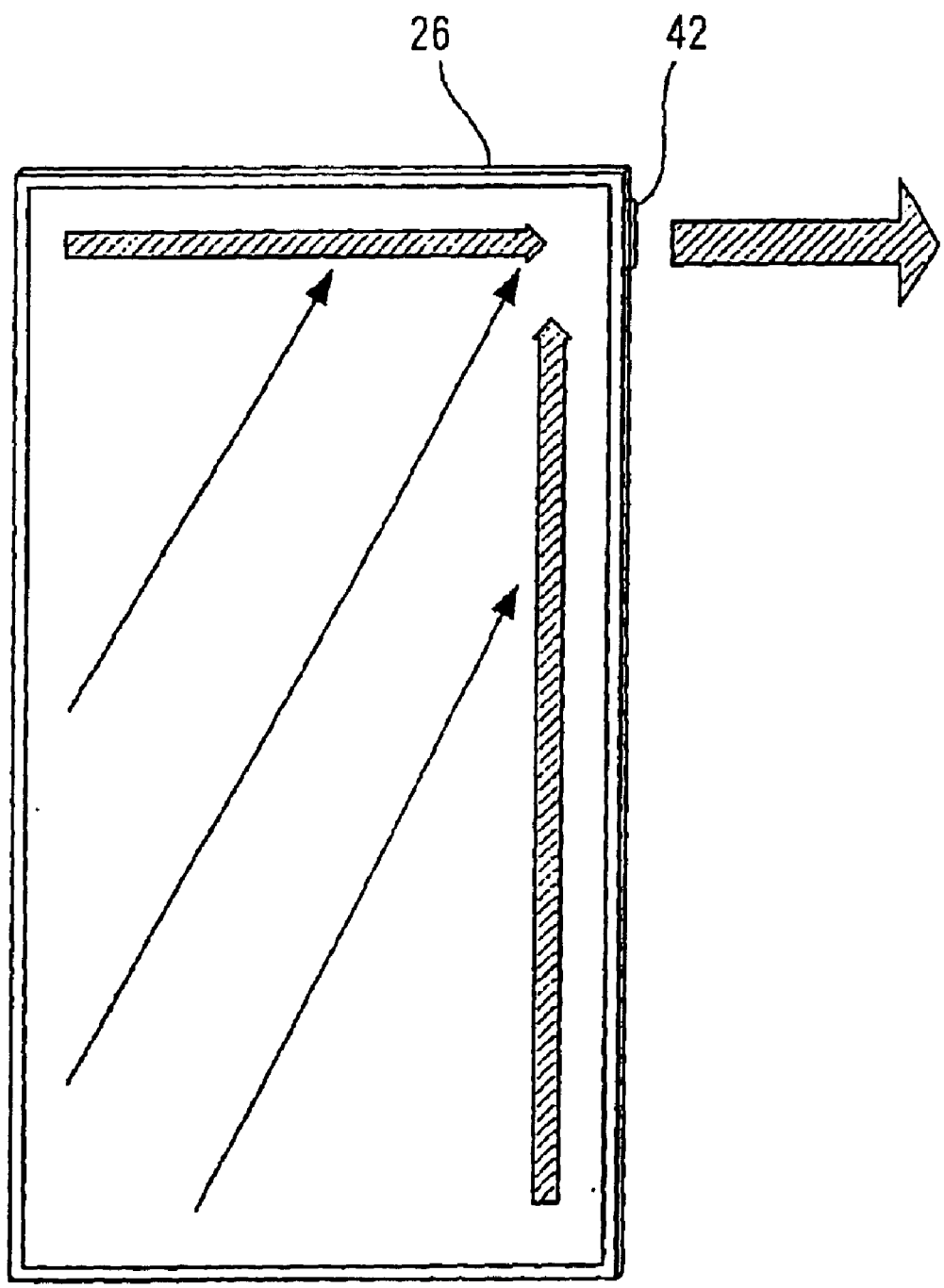
FIG. 5 is a schematic diagram illustrating the flow of permeated water in the plate-like membrane cartridge.

Referring to FIGS. 3 and 4, the air diffuser 24 has a diffuser case 24a and a diffuser tube 46 disposed sidewardly. The diffuser tube 46 has in its lower part a plurality of blowholes 47. The diffuser tube 46 is connected at one end to the air supply pipe 32 and connected at the other end to the flushing pipe 33.

With this construction, during normal air diffusion operation, the flushing valve 35 is closed so that the air to be supplied at a predetermined pressure from the blower 34 is blown off from the blowholes 47 of the diffuser tube 46. The open/close valve 30 is opened for driving the suction pump 31.

The air ejecting from the blowholes 47 aerates the intra-tank mixed liquor to supply oxygen for bioremediation, and also produces an upstream by air lift action to stir the intra-tank mixed liquor. The upstream is joined with the surrounding intra-tank mixed liquor to form an air-liquid-solid mixed phase stream. This stream runs in the crossflow passage between the plate-like membrane cartridges 26 at the lowermost stage of the filtration part 23, and then is subjected to membrane separation by the membrane cartridges 26 when passing through the crossflow passage.

Thereafter, this air-liquid-solid mixed phase stream successively flows to the crossflow passage between the upper plate-like membrane cartridges 26 for membrane separation. The upstream also functions as a traction that flushes the membrane surfaces of the membrane cartridges 26.

The permeated water from the filtration membranes 40 of the membrane cartridges 26 passes through the sloped conduits 45a, longitudinal conduits 45b, collecting passage 44, and collecting hole 43 to the permeated water outlet 42.

At this time, directing the permeated water to the collecting passage 44 wider than the sloped conduits 45a and longitudinal conduits 45b, increases the drainage property on the surfaces of the filter supporting plate 39. In addition, since the sloped conduits 45a are closer at their upper end to the collecting hole 43 than their lower end, and the plural sloped conduits 45a are present on the surfaces of the filter supporting plate 39, the permeated water can flow smoothly to the collecting hole 43 (see FIG. 5).

The smooth flow of the permeated water to the collecting hole 43 with the aid of the sloped conduits 45a suppresses the back pressure of the permeated water passage 41, thereby increasing filtration action under the differential pressure between membranes.

Since an individual plate-like membrane cartridge 26 is connected to the collecting part 28 via the tube 27 in the permeated water outlet 42 disposed on the side end surface of the filter supporting plate 39, any member (e.g., tube) which constitutes an obstruction to the upstream is not present in an upper region of the plate-like membrane cartridge 26. This realizes a smooth communication of the upstream in the crossflow passage.

During flushing operation, the flushing valve 35 is opened so that the air to be supplied from the blower 34 to the air diffuser 24 is discharged from the outlet 33a via the flushing pipe 33 under atmospheric pressure (which can be discharged under a predetermined depth).

When the outlet 33a is opened under atmospheric pressure, the pressure within the diffuser tube 46 is lowered, and the back pressure of the blowholes 47 that is located below the outlet 33a and thus receives water pressure is greater than the back pressure of the outlet 33a that corresponds to atmospheric pressure. As a result, the air within the diffuser tube 46 flows to the outlet 33a and the intra-tank mixed liquor flows via the blowholes 47 to the diffuser tube 46 that is low in pressure.

The intra-tank mixed liquor running in the diffuser tube 46 is joined with air to pass through the diffuser tube 46, thereby flushing the inside of the diffuser tube 46. This intra-tank mixed liquor is then joined with sludge within the diffuser tube 46 to enter the flushing pipe 33 and pass through the flushing pipe 33 to the outlet 33a by air lift action of the air.

To the inner surface of the diffuser tube 46, sludge is attached which enters the diffuser tube 46 when the operation of the air diffuser 24 is stopped, and which is then dried by air passing through the diffuser tube 46 during air diffusion. Infiltration of the intra-tank mixed liquor facilitates the release of the dry sludge from the inner surface of the diffuser tube 46. The released sludge is joined with the intra-tank mixed liquor to come off together from the outlet 33a as the air is discharged.

In the foregoing operation, when the intra-tank mixed liquor rapidly runs in the diffuser tube 46 that is low in pressure via the blowholes 47, the resistance of the intra-tank mixed liquor increases the pressure within the diffuser tube 46 to stop the flow of the intra-tank mixed liquor into the diffuser tube 46. When the intra-tank mixed liquor running in the diffuser tube 46 flows to the flushing pipe 33 and then discharged from the outlet 33a by air lift action, the pressure within the diffuser tube 46 is again lowered and the intra-tank mixed liquor runs in the diffuser tube 46 via the blowholes 47. The result of this is that pulsation occurs in the diffuser tube 46 and the flushing pipe 33.

At the occurrence of pulsation, the pressure within the diffuser tube 46 varies with repeated subjection to sharp increase and decrease. This produces intermittent occurrences of a flushing state that the intra-tank mixed liquor flows to the diffuser tube 46 via the blowhole 47, and an air diffusion state that the flow of the intra-tank mixed liquor into the diffuser tube 46 is stopped and part of the air blows off via the blowholes 47. At the point that the air diffusion state changes to the flushing state, a rapid flow of the intra-tank mixed liquor occurs in the diffuser tube 46. Repeated occurrences of the rapid flow increases the effect of flushing the sludge attached to the inside of the diffuser tube 46.

Second Preferred Embodiment

A second preferred embodiment will be described based on FIGS. 6 and 7. This embodiment has the same basic configuration as the first preferred embodiment. Therefore, the same references have been used for similar parts which have the same functions as the first preferred embodiment, and their description is omitted. The followings are characteristic parts of the second preferred embodiment.

Figure 6:
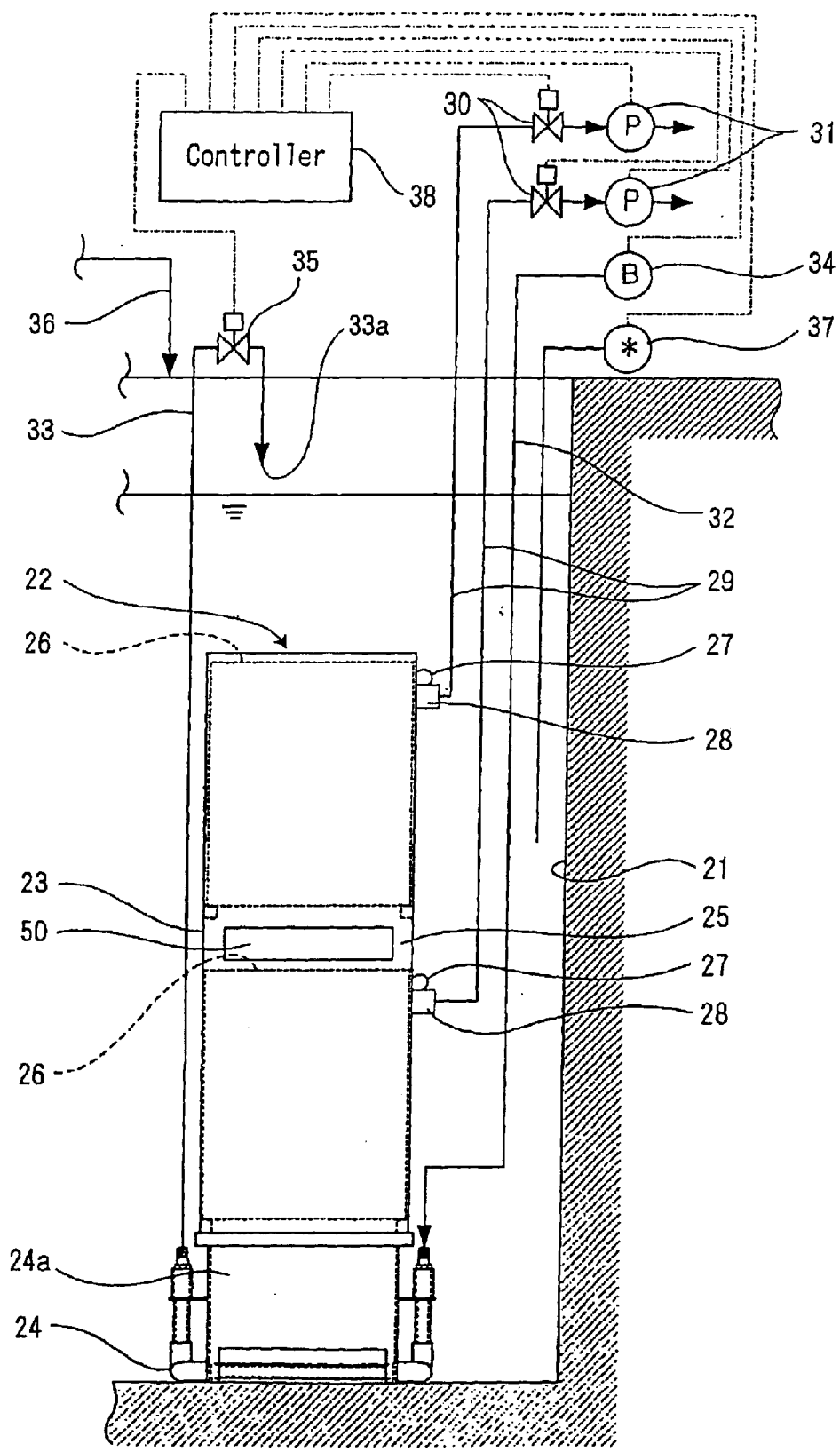
FIG. 6 is an overall front view of a multistage immersion type membrane separator according to other preferred embodiment of the invention.
Figure 7:
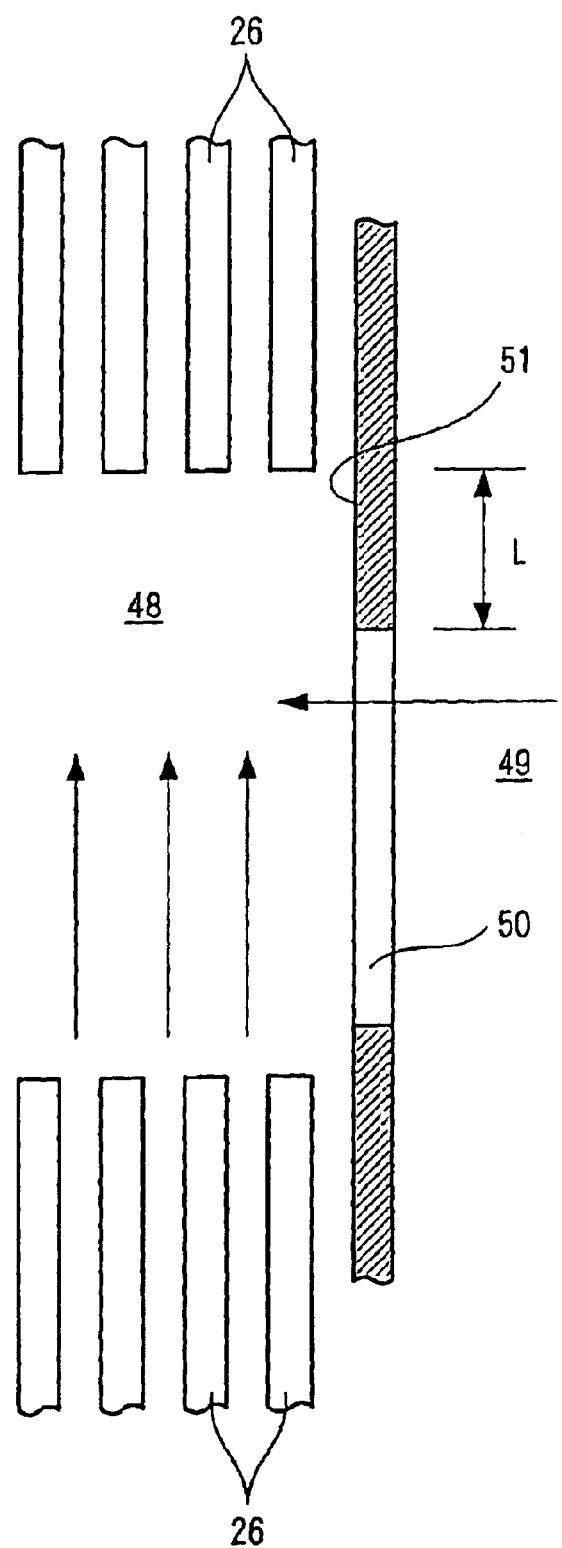
FIG. 7 is an enlarged view showing an important part of the multistage immersion type membrane separator in FIG. 6.

Referring to FIGS. 6 and 7, a filtration part 23 has an open space 48 between upper and lower sets of plate-like membrane cartridges 26. An inlet 50 making communication between the open space 48 and its surround intra-tank region 49 is disposed in a casing 25. The inlet 50 is spaced a predetermined length L apart from the bottom portions of the upper set of the plate-like membrane cartridge 26. A skirt 51 of the length L, which is part of the casing 25, surrounds a lower region of the upper set of the plate-like membrane cartridges 26.

With this construction, the intra-tank mixed liquor moves upward in the casing 25 of the filtration part 23, so that the pressure within the filtration pall 23 is lower than that of the surrounding intra-tank region 49, and thus the surrounding intra-tank mixed liquor runs in the open space 48 via the inlet 50. Therefore, when an air-liquid-solid mixed phase stream passes through the open space 48, it is joined with the intra-tank mixed liquor running in the open space 48 via the inlet 50, to flow to the crossflow passage between the upper set of the plate-like membrane cartridges 26.

Consequently, the intra-tank nixed liquor running in via the inlet 50 compensates for a reduction in the flow due to the membrane separation action of the lower set of the plate-like membrane cartridges 26, and also dilutes the sludge concentration that has been increased in the crossflow passage between the lower set of the plate-like membrane cartridges 26. These functions stabilize the sludge concentration of the intra-tank mixed liquor passing through the crossflow passages between the plate-like membrane cartridges 26 at every stage, as well as the current velocity of the crossflow. This ensures a sufficient membrane surface flushing to avoid clogging between membranes.

The skirt 51 surrounding the lower region of the upper set of the plate-like membrane cartridges 26 suppresses bubbles being ejected to the exterior when the upstream after passing through the open space 48 flows to the crossflow passage between the plate-like membrane cartridges 26 of the upper set. Otherwise, the resulting effects are the same as the first preferred embodiment.

Third Preferred Embodiment

A third preferred embodiment will be described based on FIG. 8. This embodiment has the same basic configuration as the first preferred embodiment. Therefore, the same references have been used for similar parts which have the same functions as the first preferred embodiment, and their description is omitted. The followings are characteristic parts of the third preferred embodiment.

Figure 8:
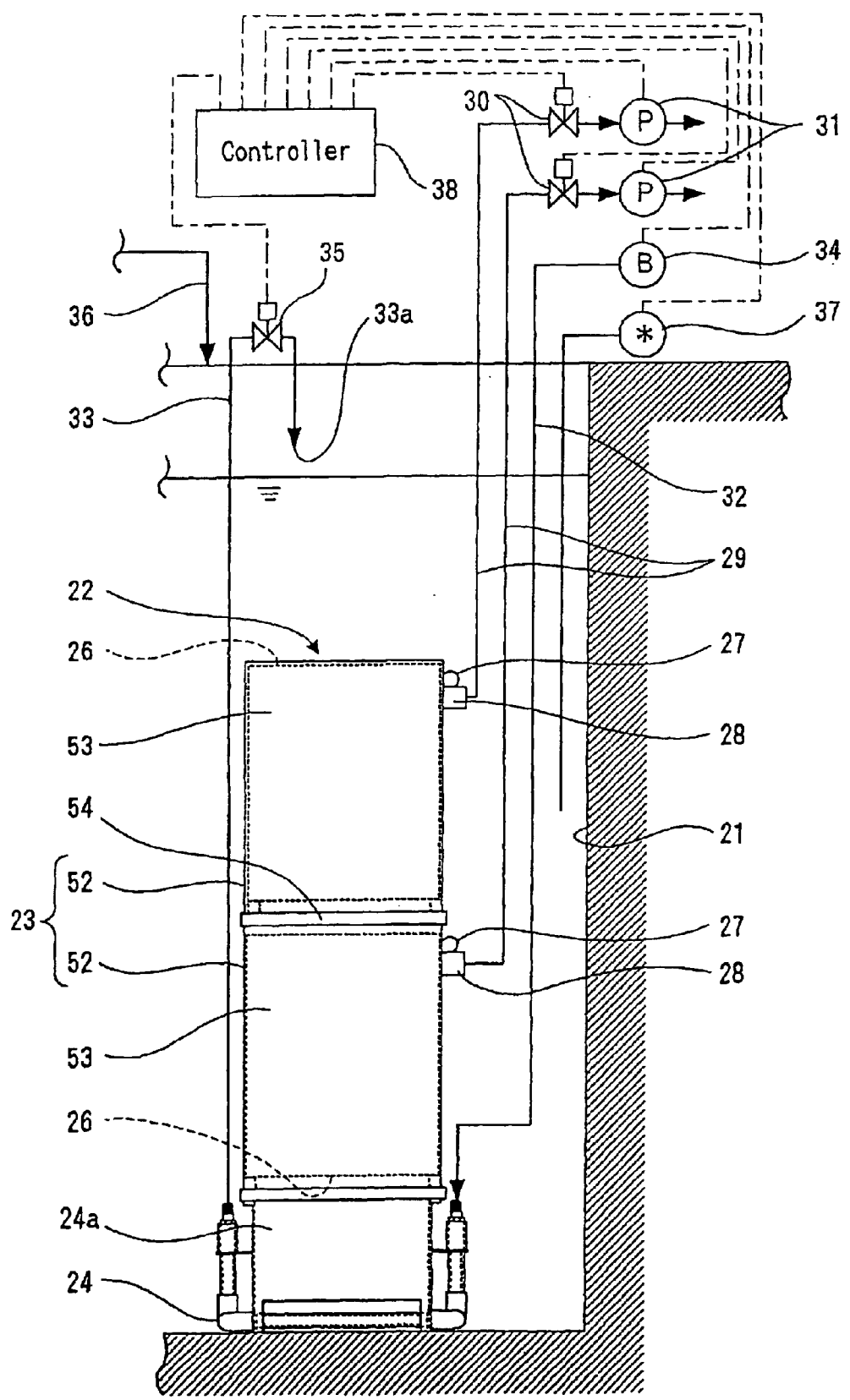
FIG. 8 is an overall front view of a multistage immersion type membrane separator according to still other preferred embodiment of the invention.

Referring to FIG. 8, a filtration part 23 has a plurality of filtration units 52 that are arranged in a vertical multistage fashion. In each filtration unit 52, a membrane case 53 contains a plurality of plate-like membrane cartridges 26 that are disposed in parallel and spaced at intervals to form a passage having a predetermined width between the adjacent membrane surfaces. The filtration units 52 standing vertically are connected to each other via a connecting member 54.

With this construction, the upstream to be produced by the air lift action of the air blowing off from the blowholes 47 of the diffuser tube 46 of the air diffuser 24 during normal operation, is subjected to membrane separation when passing through the lower filtration unit 52, and then successively flows to the upper filtration unit 52 for membrane separation. Otherwise, the resulting effects are the same as the first preferred embodiment.

Fourth Preferred Embodiment

A fourth preferred embodiment will be described based on FIGS. 9 and 10. This embodiment has the same basic configuration as the first and third preferred embodiments. Therefore, the same references have been used for similar parts which have the same functions as the first and third preferred embodiments, and their detail description is omitted. The followings are characteristic parts of the fourth preferred embodiment.

Figure 9:
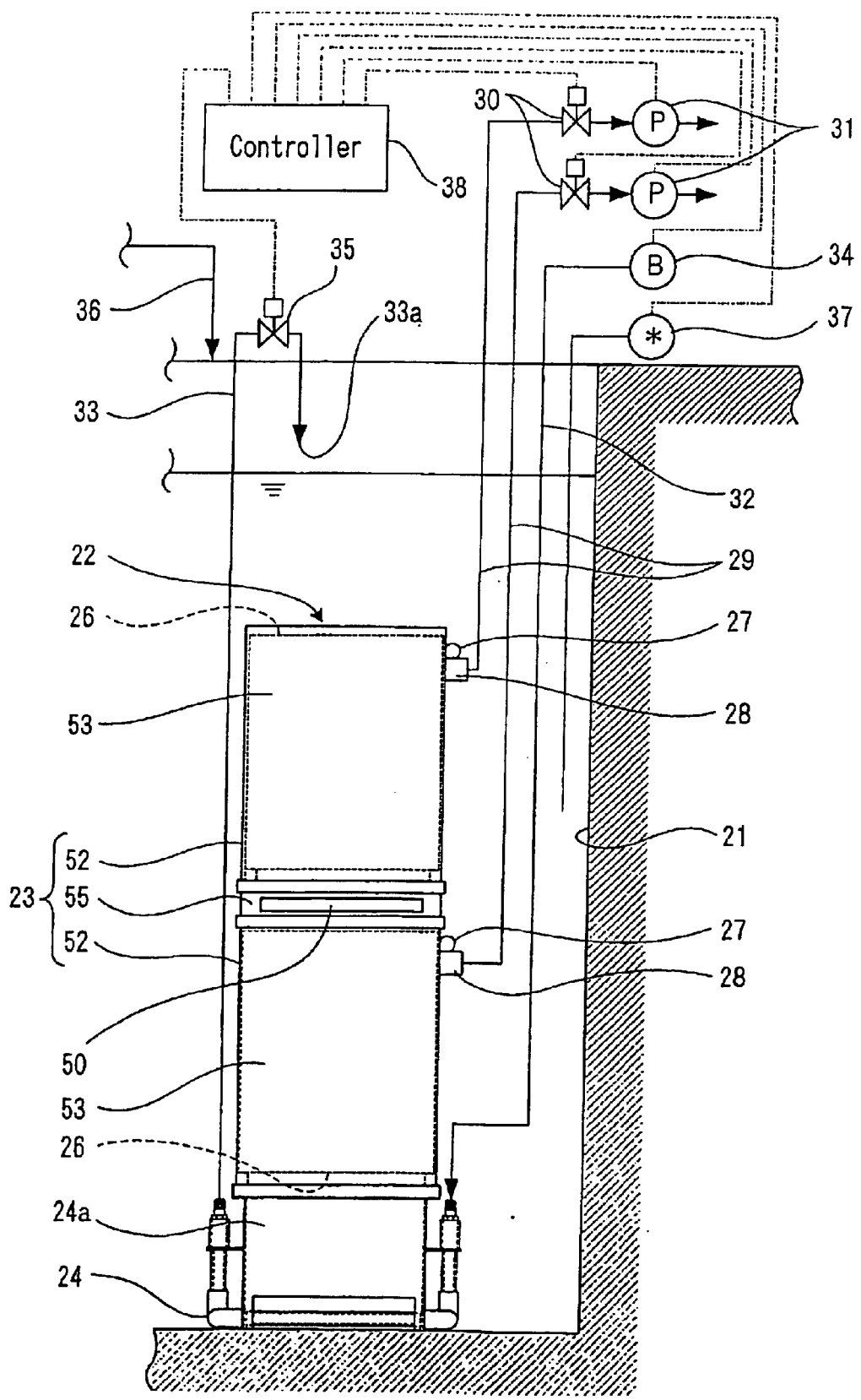
FIG. 9 is an overall front view of a multistage immersion type membrane separator according to still other preferred embodiment of the invention.
Figure 10:
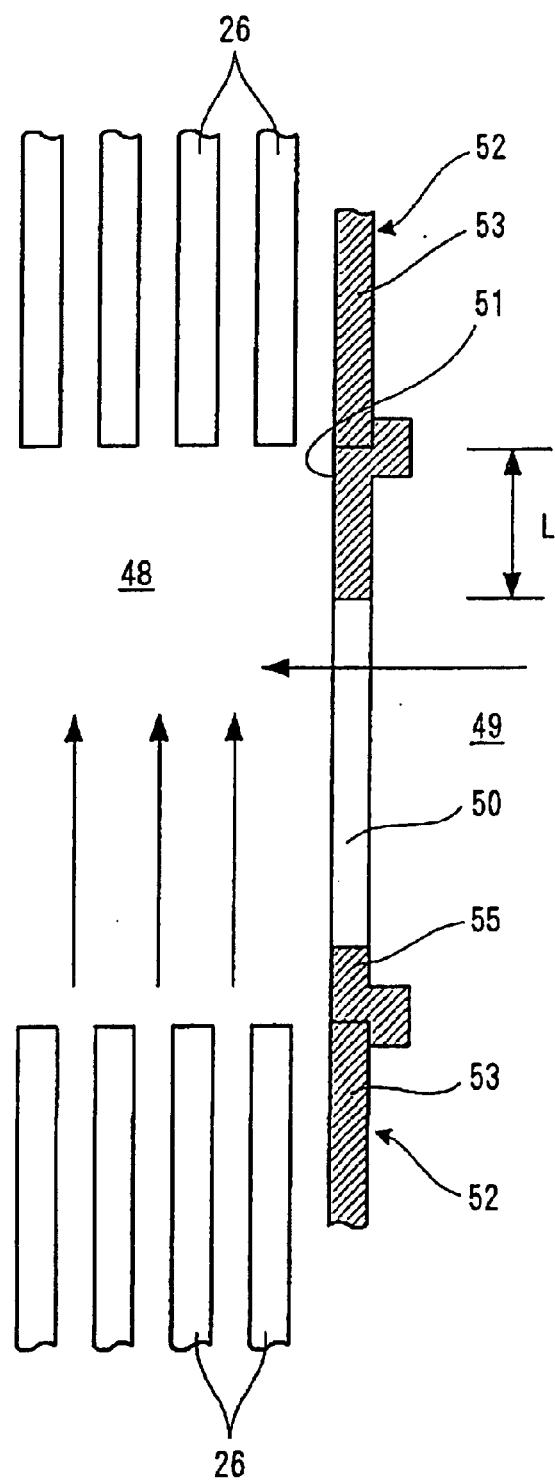
FIG. 10 is an enlarged view showing an important part of the multistage immersion type membrane separator in FIG. 9.

Referring to FIGS. 9 and 10, an intermediate case 55 forming an open space 48 is disposed between filtration units 52. The intermediate case 55 has an inlet 50 making communication between the open space 48 and its surround intra-tank region 49. The inlet 50 is spaced a predetermined length L apart from the bottom portions of the upper set of plate-like membrane cartridge 26. A skirt 51 of the length L, which is part of the intermediate case 55, surrounds a lower region of the upper set of the plate-like membrane cartridges 26.

With this construction, an intra-tank mixed liquor moves upward in the filtration part 23, so that the pressure within the filtration part 23 is lower than that of the surrounding intra-tank region 49 and thus the surrounding intra-tank mixed liquor runs in the open space 48 of the intermediate case 55 via the inlet 50. Therefore, when an air-liquid-solid nixed phase stream passes through the open space 48, it is joined with the intra-tank mixed liquor running in the open space 48 via the inlet 50, to flow to the crossflow passage between the upper set of the plate-like membrane cartridges 26.

Consequently, the intra-tank mixed liquor running in via the inlet 50 compensates for a reduction in the flow due to the membrane separation action of the lower set of the plate-like membrane cartridges 26, and also dilutes the sludge concentration that has been increased in the crossflow passage between the lower set of the plate-like membrane cartridges 26. These functions stabilize the sludge concentration of the intra-tank mixed liquor passing through the crossflow passages between the respective plate-like membrane cartridges 26 at every stage, as well as the current velocity of the crossflow. This ensures a sufficient membrane surface flushing to avoid clogging between membranes.

The skirt 51 of the intermediate case 55 surrounding the lower region of the upper set of the plate-like membrane cartridges 26, suppresses bubbles being ejected to the exterior when the upstream after passing through the open space 48 flows to the crossflow passage between the upper plate-like membrane cartridges 26. Otherwise, the resulting effects are the same as the first, second, and third preferred embodiments.

Fifth Preferred Embodiment

A fifth preferred embodiment will be described based on FIGS. 11 to 24. This embodiment has the same basic configuration as the first and third preferred embodiments. Therefore, the same references have been used for similar parts which have the same functions as the first and third preferred embodiments, and their description is omitted. The followings are characteristic parts of the fifth preferred embodiment.

Figure 11:
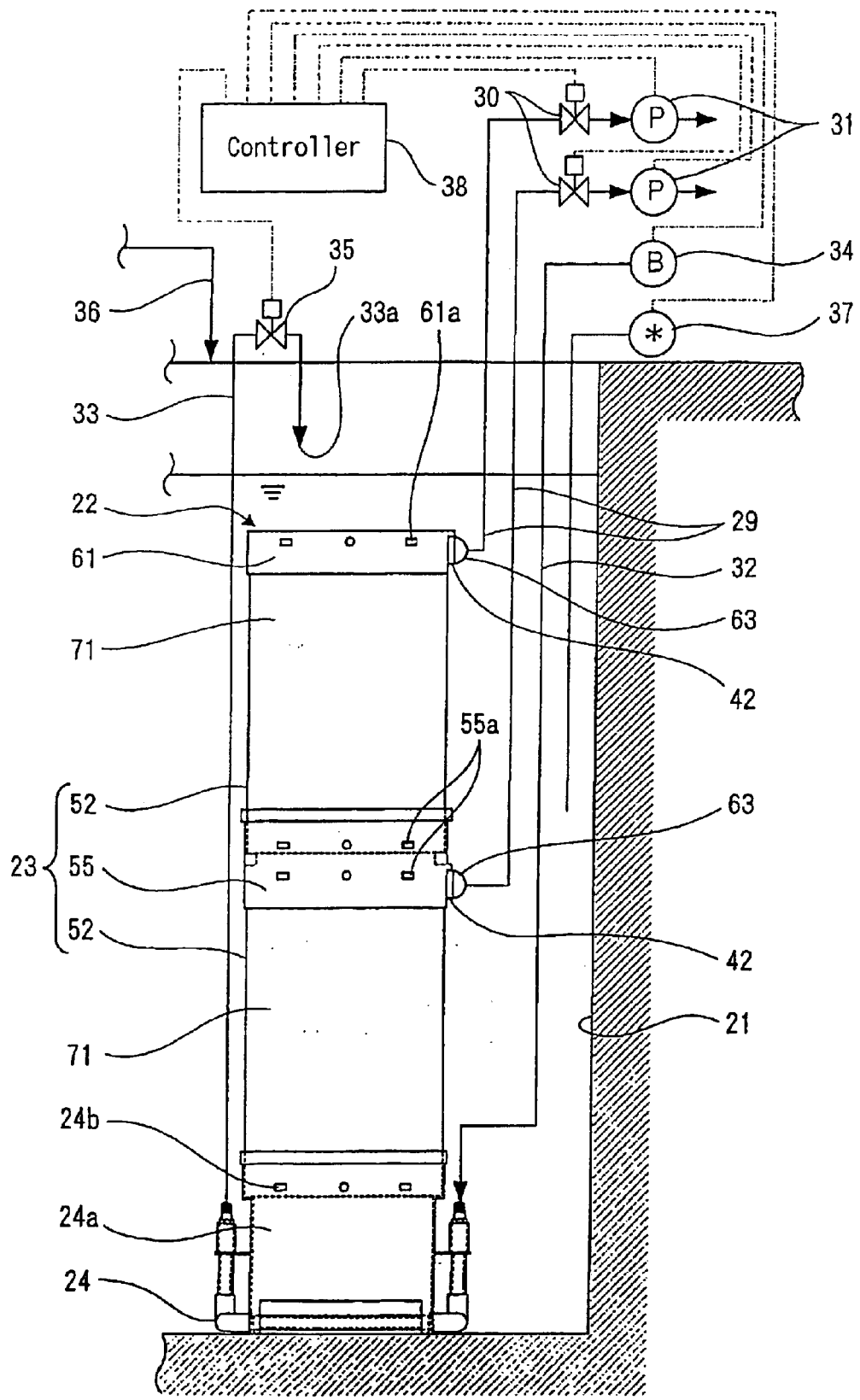
FIG. 11 is an overall front view of a multistage immersion type membrane separator according to still other preferred embodiment of the invention.

Referring to FIG. 11, a multistage immersion type membrane separator 22 has a plurality of filtration units 52 arranged in a vertical multistage fashion in a filtration part 23.

Figure 12:
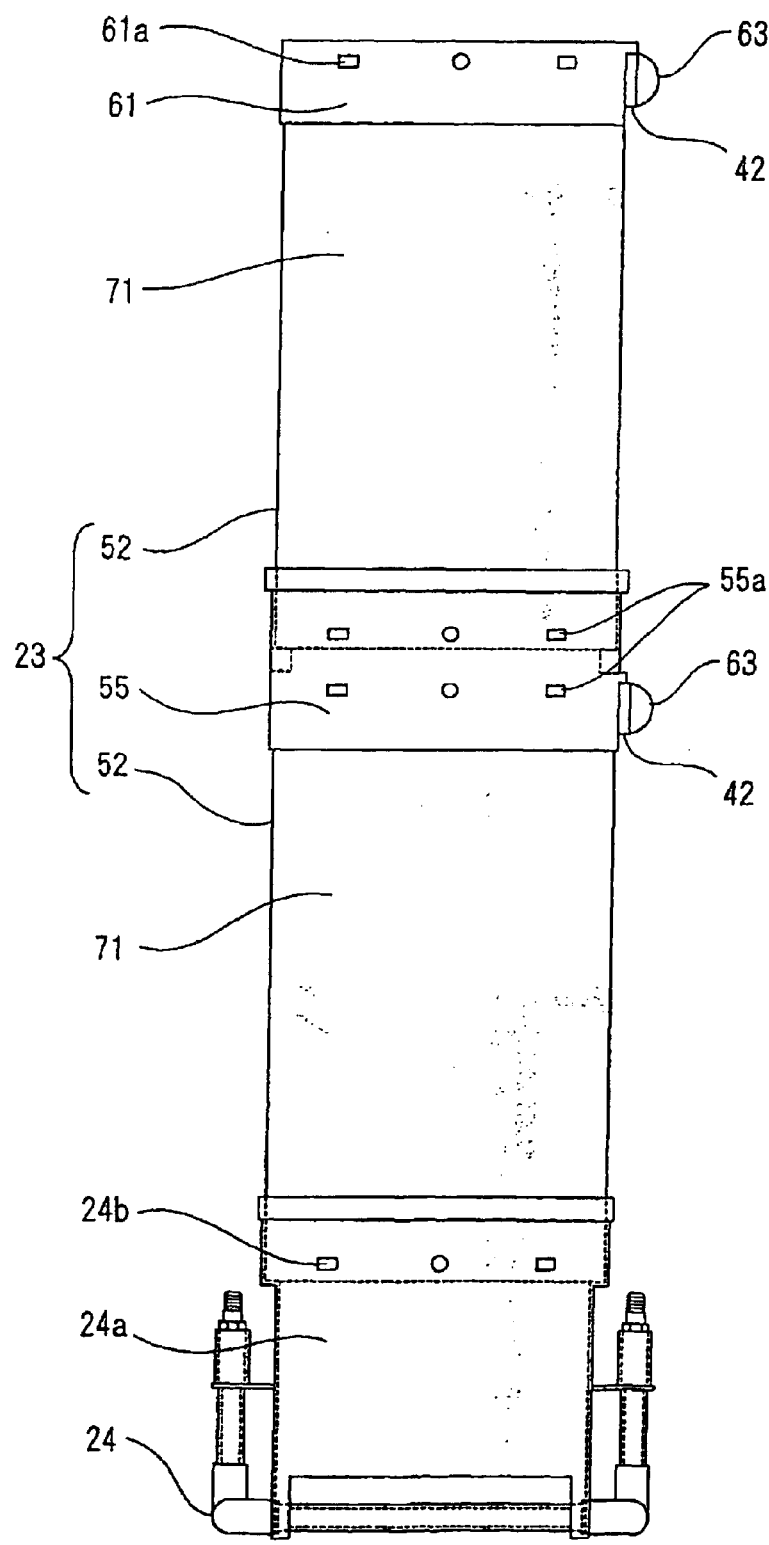
FIG. 12 is another overall front view of the multistage immersion type membrane separator in FIG. 11.
Figure 13:
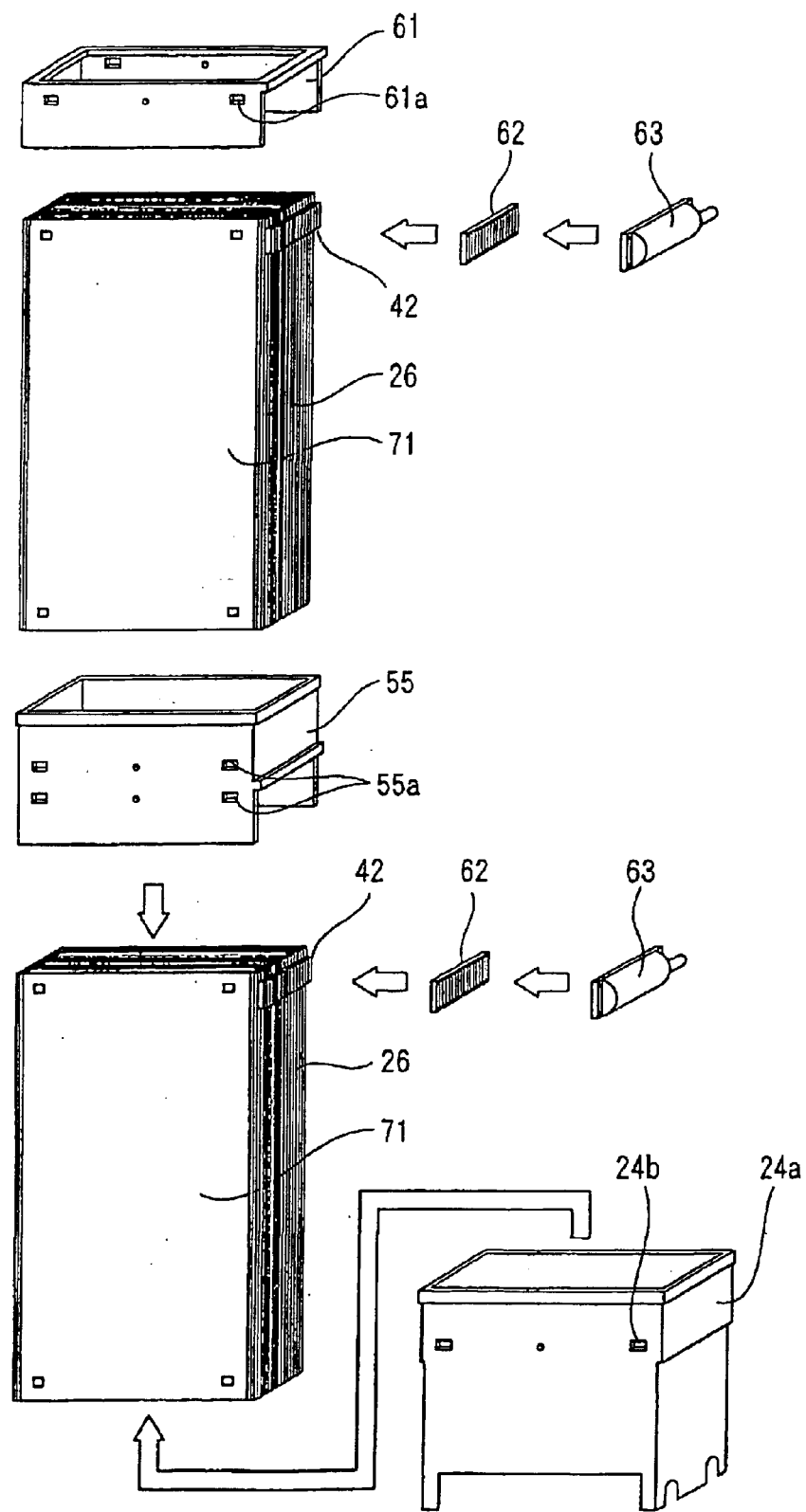
FIG. 13 is an exploded view of the multistage immersion type membrane separator in FIG. 11.

Referring to FIGS. 12 and 13, in an upper filtration unit 52, an upper cover 61 is engaged to the upper portions of plural plate-like membrane cartridges 26, and an intermediate case 55 is engaged to the lower portions. In a lower filtration unit 52, the intermediate case 55 is engaged to the upper portions of plural plate-like membrane cartridges 26, and a diffuser case 24a is engaged to the lower portions. The upper and lower filtration units 52 are provided with a gasket 62 and collecting part 63, each covering a permeated water outlet 42 projecting beyond a side end surface 39a of a filter supporting plate 39 of each plate-like membrane cartridge 26. These will be fully described later.

Figure 14:
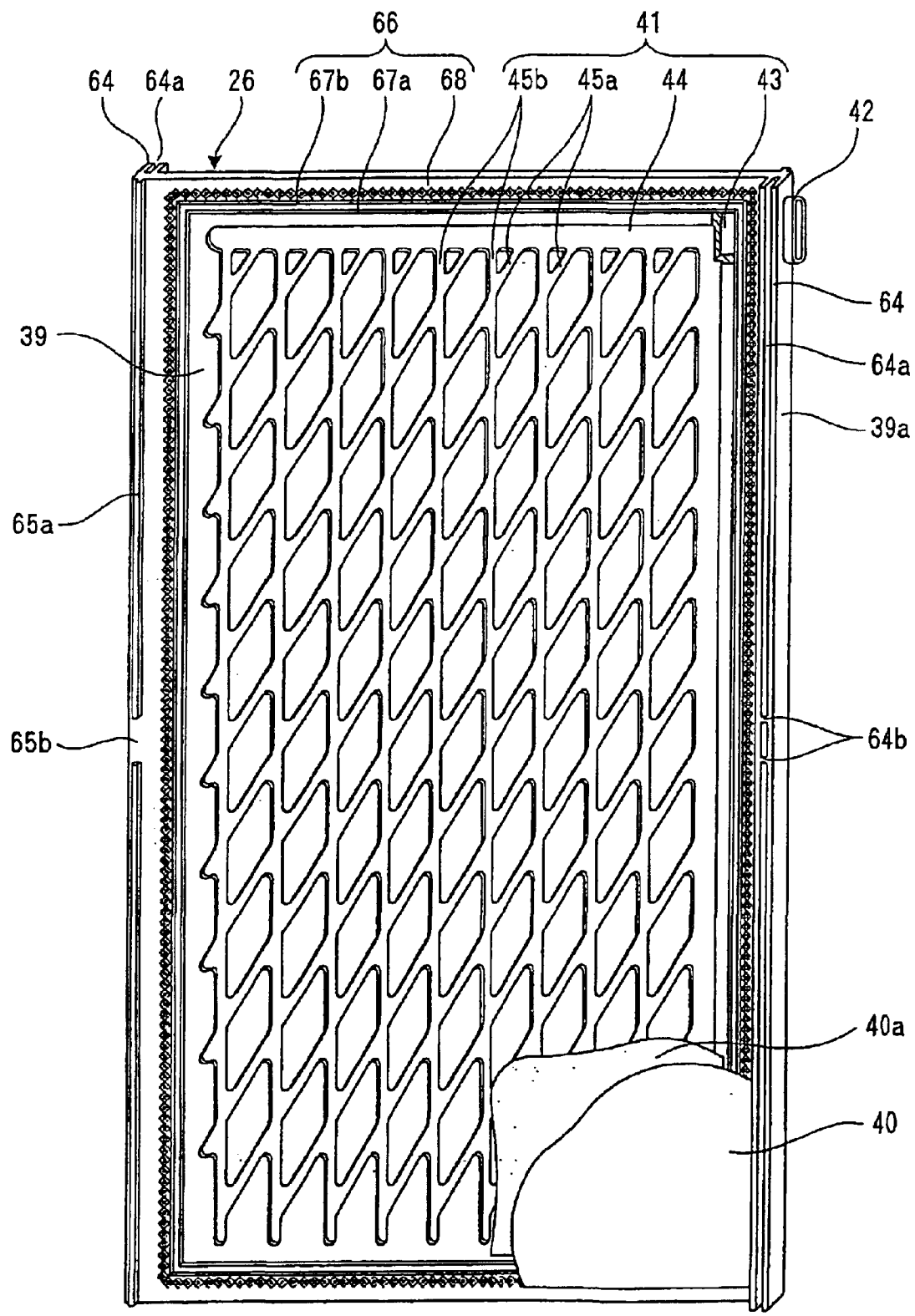
FIG. 14 is a perspective view of a plate-like membrane cartridge of the multistage immersion type membrane separator in FIG. 11.
Figure 15B:
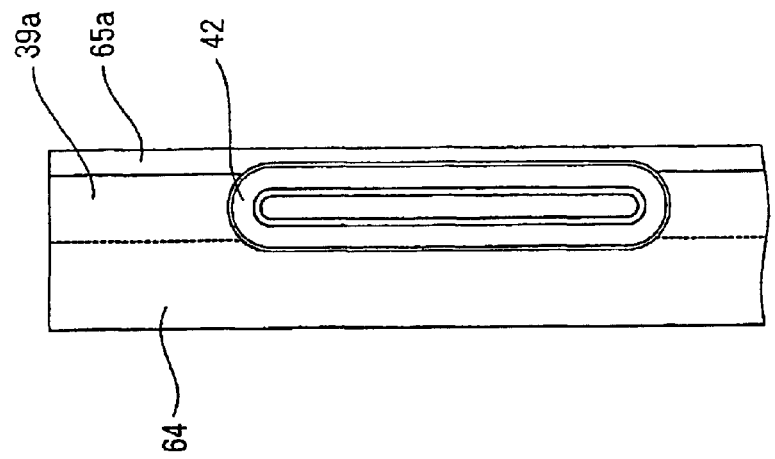
FIGS. 15(A) and 15(B) are an enlarged front view and an enlarged side view, respectively, each showing an important part of the plate-like membrane cartridge in FIG. 14.
Figure 15A:
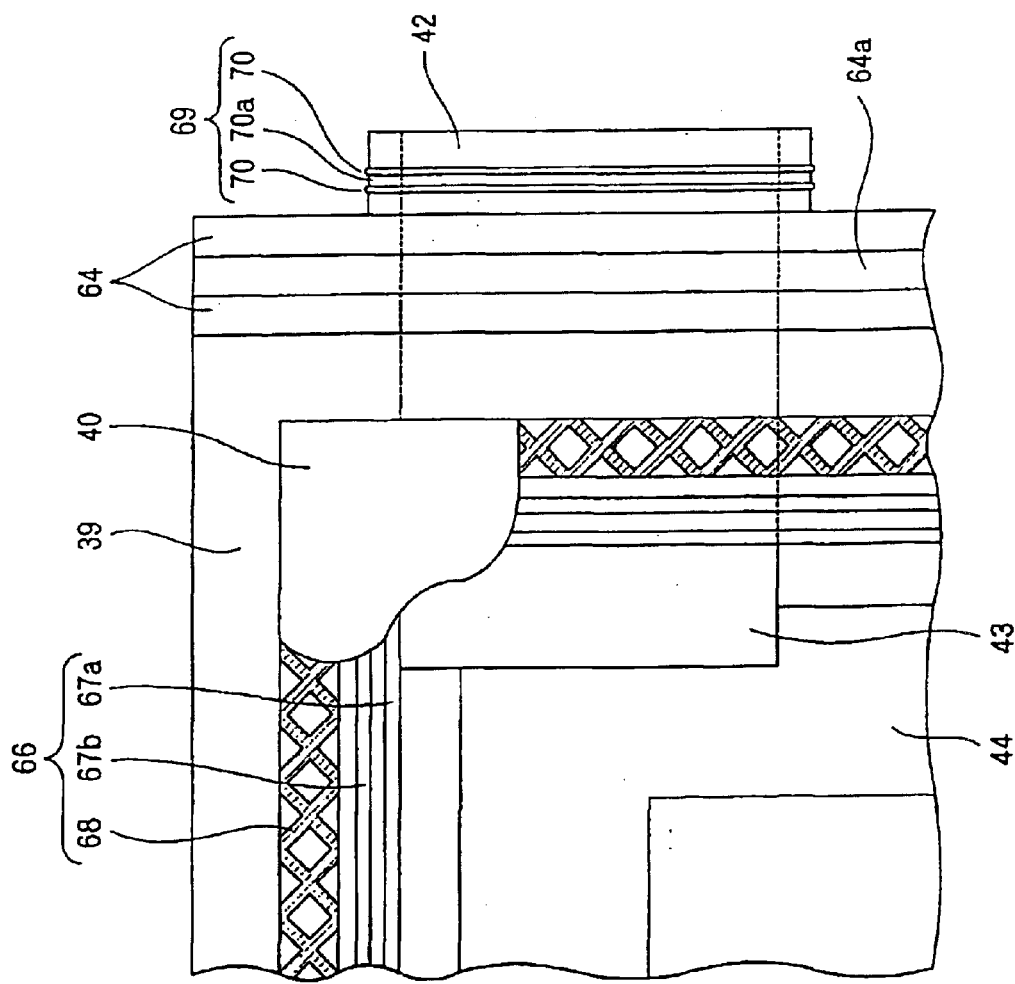

Referring to FIGS. 14 to 16, in each plate-like membrane cartridge 26, a wall piece part 64 having a predetermined height is formed on one side edge portion of the front and rear surfaces of the filter supporting plate 39 such that it extends over the entire length in the longitudinal direction of the filter supporting plate 39. A groove-like concave portion 64a is formed in the wall piece part 64, except for a break portion 64b on the way. In the other side edge part of the front and rear surfaces of the filter supporting plate 39, a ridge-like convex portion 65a is formed at the back of the wall piece part 64, except for a break portion 65b.

A weld allowance 66 for welding a filtration membrane 40 is formed on the front and rear surfaces of the filter supporting plate 39. The weld allowance 66 is made up of main weld allowances 67a and 67b in a double-line, and an auxiliary weld allowance 68, each of which is formed all around of the filter supporting plate 39. A pair of ribs 70 forming part of a circular seal part 69 are formed circularly all around on the outer peripheral surface of the permeated water outlet 42.

Figure 17:
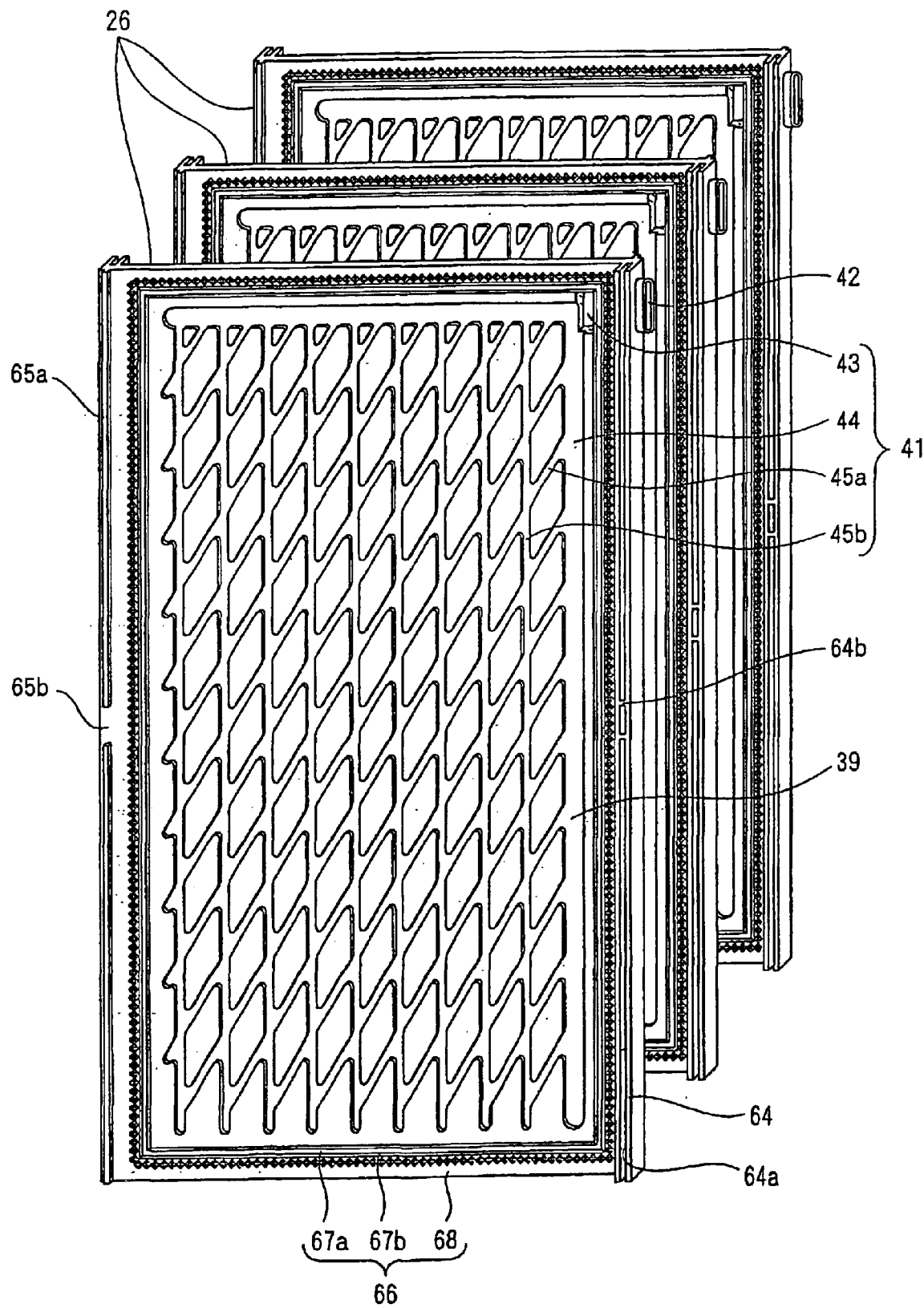
FIG. 17 is a perspective view showing an array of the plate-like membrane cartridges in FIG. 14.
Figure 19:
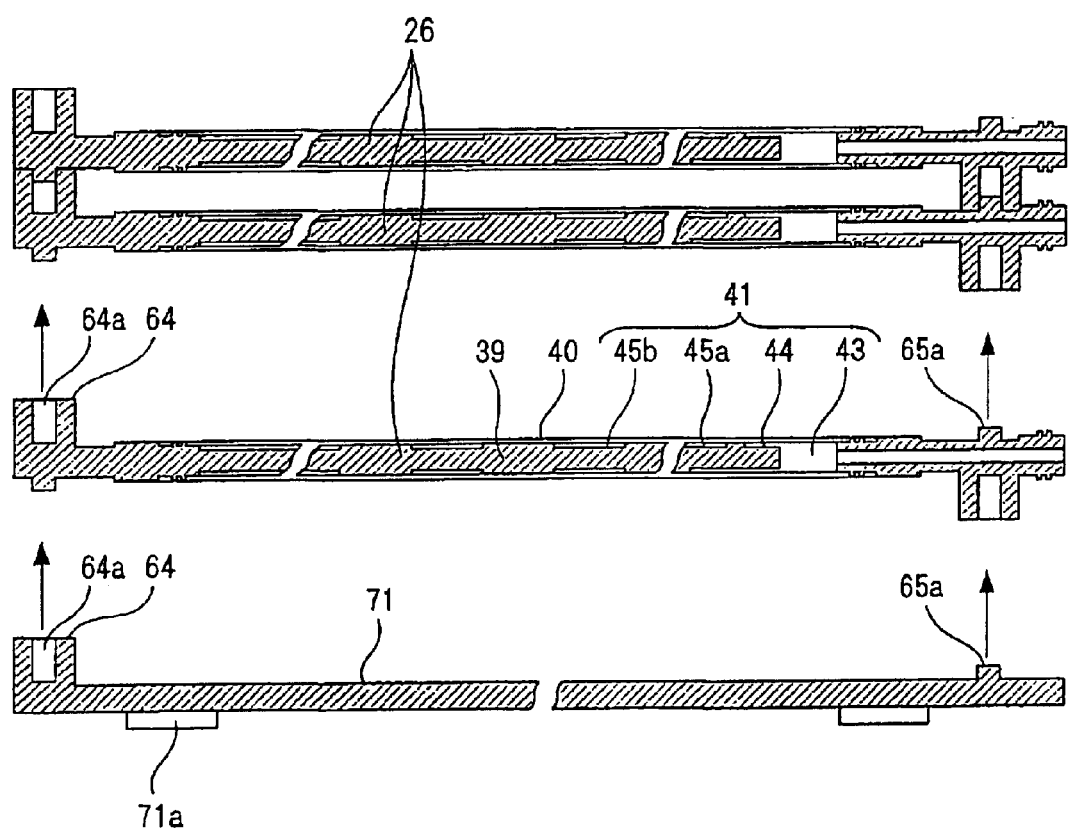
FIG. 19 is a plan sectional view illustrating an array of the plate-like membrane cartridges in FIG. 14.
Figure 20:
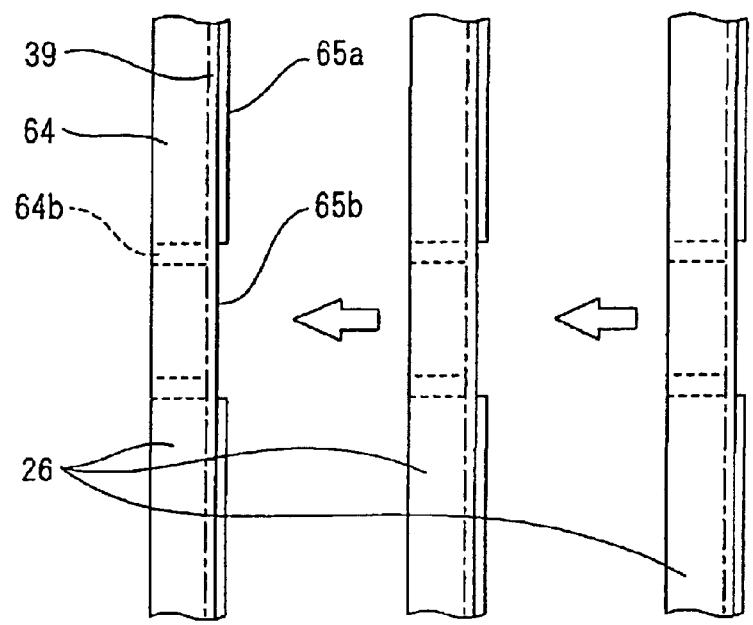
FIG. 20 is a side view illustrating the array of the plate-like membrane cartridges.
Figure 21:
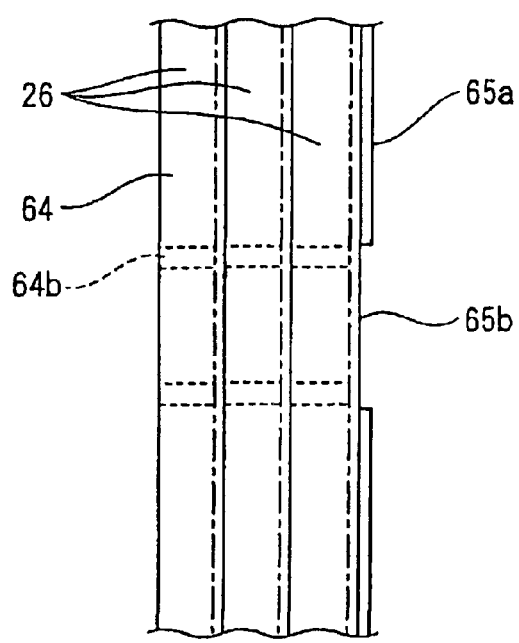
FIG. 21 is another side view illustrating the array of the plate-like membrane cartridges.

Referring to FIG. 17, in the filtration unit 52, plural plate-like membrane cartridges 26 are arranged in a vertical direction in which these are disposed in parallel and spaced at intervals to form a crossflow passage having a predetermined width between the membrane surfaces of the adjacent plate-like membrane cartridges 26. The wall pieces part 64 of each plate-like membrane cartridge 26 is in contact with the side edge portion of the adjacent plate-like membrane cartridge 26, and the opposed concave portion 64a and convex portion 65a of the wall piece part 64 are in engagement. With this construction, the wall piece part 64 closes the side opening of the crossflow passage, and a side cover 71 covers the outermost plate-like membrane cartridge 26.

Referring to FIG. 18, as in the plate-like membrane cartridge 26, the side cover 71 is provided with a wall piece part 64 having a concave portion 64a and a convex portion 65a, and the wall piece part 64 is in contact with the side edge portion of the plate-like membrane cartridge 26, and the respective concave portion portions 64a and convex portions 65a of the side cover 71 and plate-like membrane cartridge 26 are in engagement.

Rectangular projections 71a are formed on upper and lower parts of the side cover 71. Each rectangular projection 71a is continuous with the side cover 71 at one of its four sides, and is separated therefrom at the rest. The projection 71a can be elastically deformed in a direction of from front to rear of the side cover 71.

The upper cover 61 forms a frame of upper and lower openings, and is engaged to each plate-like membrane cartridge 26 and to the upper part of the side cover 71 for bundling these. Engagement between an engagement hole 61a formed at a predetermined position of the upper cover 61 and an engagement projection 71a of the side cover 71 prevents the upper cover 61 from slipping off.

The diffuser case 24a forms a frame of upper and lower openings, and is engaged to each plate-like membrane cartridge 26 and to the lower part of the side cover 71 for bundling these. Engagement between an engagement hole 24b formed at a predetermined position of the diffuser case 24a and the engagement projection 71a of the side cover 71 prevents the diffuser case 24a from slipping off.

The intermediate case 55 forms a frame of upper and lower openings. The case 55 is engaged to the upper set of the plate-like membrane cartridges 26 and to the lower part of the side cover 71 for bundling these, and also engaged to the lower set of the plate-like membrane cartridges 26 and to the upper part of the side cover 71 for bundling these. Engagement between an engagement hole 55a formed at a predetermined position of the intermediate case 55 and the engagement projection 71a of the side cover 71 prevents the intermediate case 55 from slipping off.

In the filtration unit 52, a side wall part is formed by a connection between the side edge surface 39a and the wall pieces part 64 of the filter supporting plate 39 of each plate-like membrane cartridge 26. The collecting part 63 is attached to the filtration unit 52 so as to cover all the permeated water outlets 42 projecting beyond the outer surface of the side wall part, and a gasket 62 is interposed between the side wall part and collecting part 63.

Figure 22:
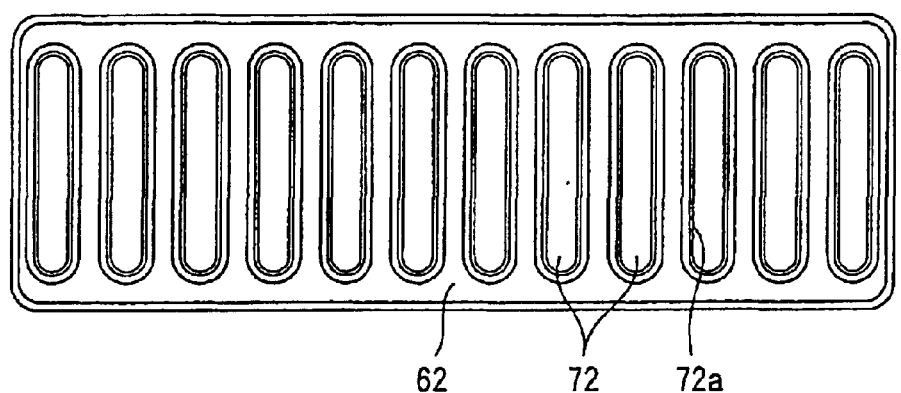
FIG. 22 is a front view of a gasket of the multistage immersion type membrane separator in FIG. 11.
Figure 23:
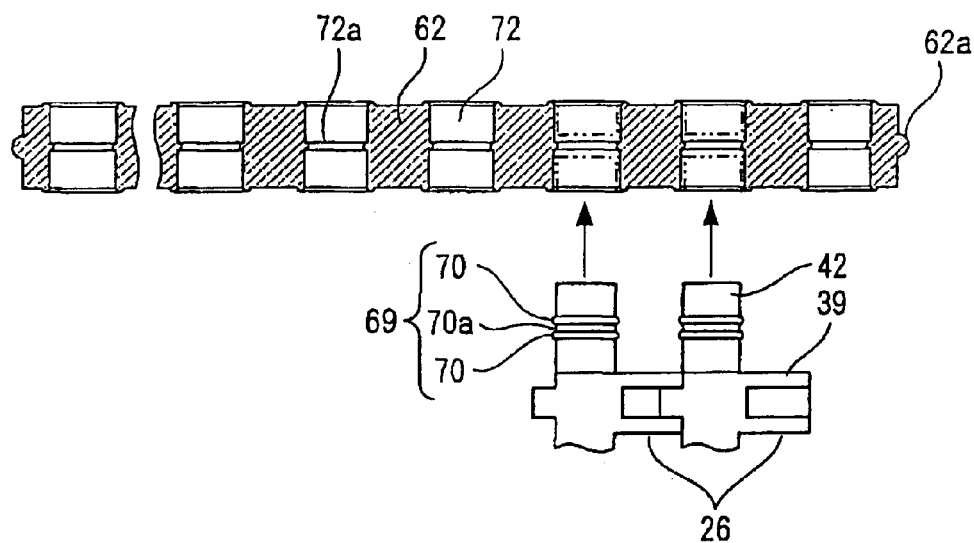
FIG. 23 is sectional view of the gasket.

Referring to FIGS 22 and 23, the gasket 62 is provided with a plurality of through holes 72 to which the respective permeated water outlets 42 are engaged. Each through hole 72 is pressed at its inner peripheral surface against the outer peripheral surface of the permeated water outlet 42, and the surrounding of the permeated water outlet 42 covered with the collecting part 63 is coated to effect the function of sealing. In the gasket 62, a convex portion 72a is circularly formed all around the inner peripheral surface of the through hole 72. The convex portion 72a fits in and presses against the concave portion 70a between the paralleled projections 70 formed on the outer peripheral surface of the permeated water outlet 42. thereby effecting the function of sealing.

Figure 24:
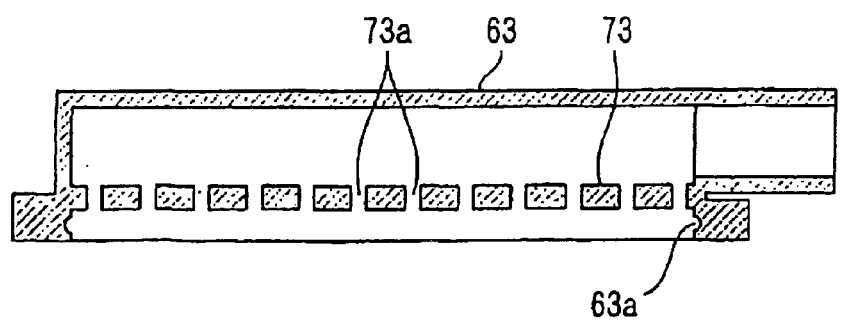
FIG. 24 is a sectional view of a collecting part of the multistage immersion type membrane separator in FIG. 11.

Referring to FIG. 24, the collecting part 63 is provided with pressing portions 73 for pressing the gasket 62. In the pressing portions 73, there are a plurality of through holes 73a communicated to the corresponding opening of the permeated water outlet 42. The inner peripheral surface of the collecting part 63 is provided with a circular concave portion 63a to be fit in a circular convex portion 62a on the outer peripheral surface of the gasket 62.

Operations in the foregoing construction will be described below. The air blowing off from the blowholes 47 of the diffuser tube 46 in the air diffuser 24 produces an upstream. The upstream is joined with the surrounding intra-tank mixed liquor of the multistage immersion type membrane separator 22 to flow to the crossflow passage between the plate-like membrane cartridges 26 arranged in the lower filtration unit 52. At this time, the intra-tank mixed liquor is filtered by the membrane cartridges 26, and then successively flows to the upper filtration unit 52 for membrane separation.

In the filtration units 52, a side wall part is formed by a connection between the side edge surfaces 39a and the wall piece part 64 of the filter supporting plate 39 of each plate-like membrane cartridge 26. The side wall part and side covers 71 on opposite sides form a casing that surrounds all the plate-like membrane cartridges 26. Thus, the plate-like membrane cartridge 26 itself serves as part of the casing. Therefore, this construction requires no such a case for holding the membrane cartridges 26 as is conventional.

In the multistage immersion type membrane separator 22, the wall piece part 64 performs positioning and spacing between the adjacent plate-like membrane cartridges 26. The upper and lower sets of the plate-like membrane cartridges 26 are integrally bundled by the upper cover 24, intermediate case 55, and diffuser case 24a, thus facilitating assembly and disassembly works.

In assembling the filtration units 52, the concave portion 64a of the wall piece part 64 and the rib-like convex portion 65a are brought into engagement, and the concave portion 64a and convex portion 65a are axially engaged with each other at the break portions 64b and 65b. This effects positioning in the direction of above and below, and the direction of side to side, on the filtration membranes of each plate-like membrane cartridges 26, as well as the prevention of dislocation in these directions. Therefore, it is easy to carry out assembly work.

In the plate-like membrane cartridges 26, the permeated water outlet 42 is disposed on the side edge surface 39a of the filter supporting plate 39, and the collecting part 63 is disposed on the side part of the filtration unit 52 so as to cover entirely the permeated water outlet 42. It is therefore unnecessary that the membrane cartridges 26 are individually connected to the collecting part 63 via a tube. Since any member such as tube constituting an obstruction to the upstream is not present above the filtration unit 52, the upstream of the intra-tank mixed liquor can smoothly pass through the passage between the adjacent plate-like membrane cartridges 26. Otherwise, the resulting effects arc the same as the first and third preferred embodiments.

Sixth Preferred Embodiment

A sixth preferred embodiment will be described based on FIGS. 25 and 26. This embodiment has the same basic configuration as the first, third, and fifth preferred embodiments. Therefore, the same references have been used for similar parts, and their description is omitted. The followings are characteristic pails of the sixth preferred embodiment.

Figure 25:
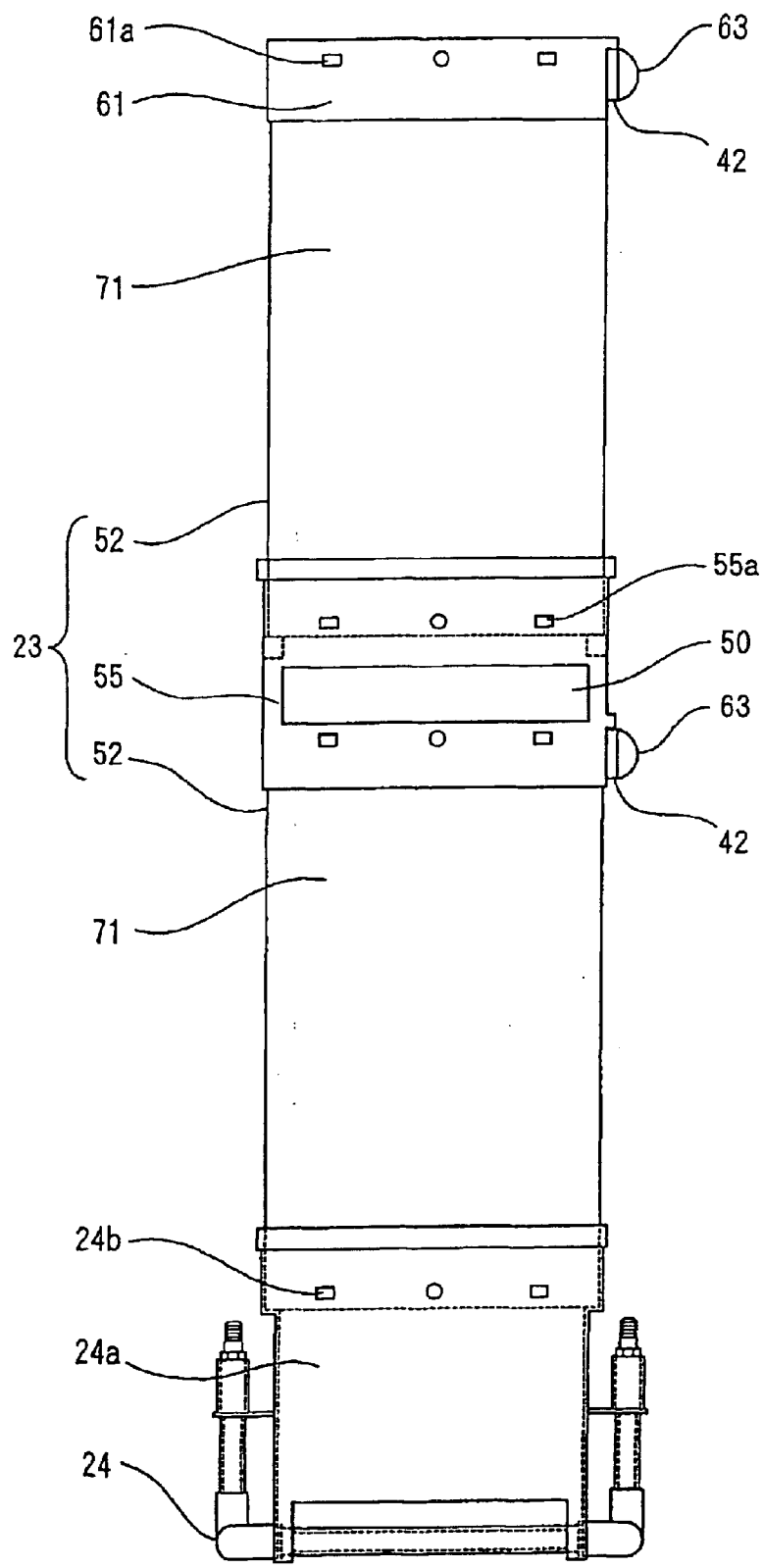
FIG. 25 is an overall front view of a multistage immersion type membrane separator according to still other preferred embodiment of the invention.

Referring to FIGS. 25 and 26, an intermediate case 55 between filtration units 52 forms an open space 48. The intermediate case 55 has an inlet 50 making communication between the open space 48 and its surrounding intra-tank region 49. The inlet 50 is spaced a predetermined length L apart from the bottom portions of the upper set of plate-like membrane cartridge 26. A skirt 51 of the length L, which is part of the intermediate case 55, surrounds a lower region of the upper set of the plate-like membrane cartridges 26.

With this construction, an intra-tank mixed liquor moves upward in the filtration part 23, so that the pressure within the filtration part 23 is lower than that of the surrounding intra-tank region 49 and the surrounding intra-tank mixed liquor runs in the open space 48 of the intermediate case 55 via the inlet 50. Therefore, when the air-liquid-solid mixed phase stream passes through the open space 48, it is joined with the intra-tank mixed liquor running in the open space 48 via the inlet 50, to flow to the crossflow passage between the plate-like membrane cartridges 26 of the upper set.

The intra-tank mixed liquor running in via the inlet 50 compensates for a reduction in the flow due to the membrane separation action of the plate-like membrane cartridges 26 of the lower set, and also dilutes the sludge concentration that has been increased in the crossflow passage between the plate-like membrane cartridges 26 of the lower set. These functions stabilize the sludge concentration of the intra-tank mixed liquor passing through the crossflow passages between the plate-like membrane cartridges 26 at every stage, as well as the current velocity of the crossflow. This ensures a sufficient membrane surface flushing to avoid clogging between membranes.

The skirt 51 of the intermediate case 55, which surrounds the lower region of the plate-like membrane cartridges 26 of the lower set, suppresses bubbles being ejected to the exterior when the upstream passing through the open space 48 flows to the crossflow passage between the upper plate-like membrane cartridges 26. Otherwise, the resulting effects are the same as the first, second, third, fourth, and fifth preferred embodiments.

Seventh Preferred Embodiment

A seventh preferred embodiment of the invention will be described based on FIGS. 27 and 28. This embodiment discloses another construction of the air diffuser 24, which is applicable to the multistage immersion type membrane separator 22 of the first to sixth preferred embodiments. The same references have been used for similar parts which have the same functions as the foregoing embodiments, and their detail description is omitted. The followings are characteristic parts of the seventh preferred embodiment.

Figure 27:
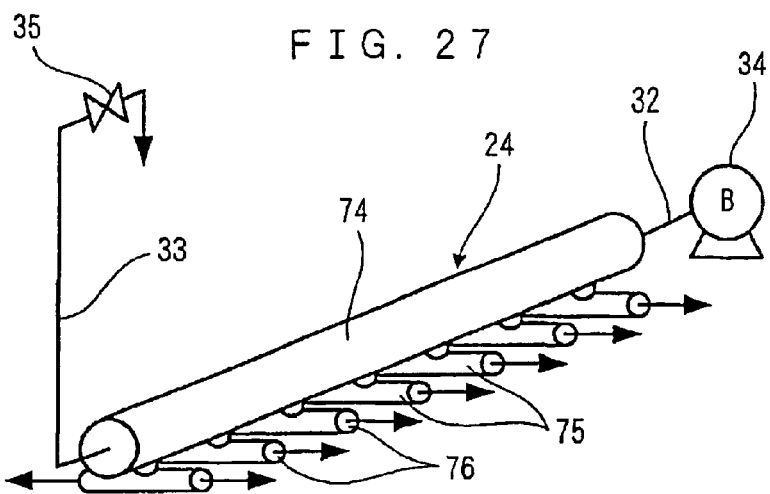
FIG. 27 is a perspective view of an air diffuser according to still other preferred embodiment of the invention.
Figure 28:
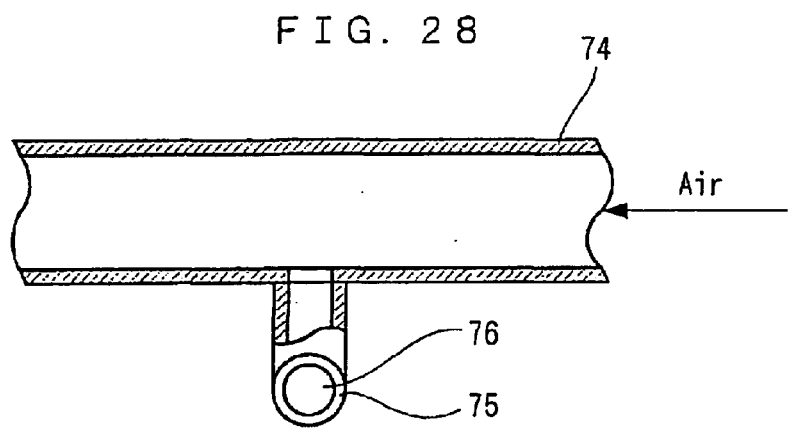
FIG. 28 is a sectional view of the air diffuser in FIG. 27.

Referring to FIGS. 27 and 28, a diffuser tube 46 of an air diffuser 24 is made up of a main pipe 74 that is disposed sidewardly and formed by a large-diameter pipe having a predetermined aperture, and a plurality of branch pipes 75 are disposed below the main pipe 74 and formed by a small-diameter pipe having a predetermined aperture.

The main pipe 74 is communicated at its basal end to a blower 34 via an air supply pipe 32, and is connected at its tip to a flushing pipe 33 extending vertically. Each branch pipe 75 is in an inverted T-shape and communicated, at one end of its upper part, to the main pipe 74. Blowholes 76 are formed by the openings at the opposite ends of each branch pipe 75 that are located below the main pipe 74.

A controller 36 detects the amount of wastewater flow by the aid of a water level gauge 37 and an arithmetic circuit contained in the controller 36. On the arithmetic circuit of the controller 36, the current waste water flow is obtained by calculating a displacement of water level in unit time based on the output value of the water level gauge 37, and dividing the displacement by the area of the tank bottom of a treatment tank 21.

The controller 36 opens a flushing valve 35 at a particular time that the amount of wastewater flow is below a predetermined value, or at predetermined time-spaced intervals at which a self-contained timer is set. The controller 35 also controls start/stop of a suction pump 31 and the blower 34.

The operation in the above construction will be described below. During normal air diffusion operation, the controller 36 closes the flushing valve 35 so that air having a predetermined pressure is supplied from the blower 34 to the diffuser tube 46. The air passes through the main pipe 74 to the respective branch pipes 75, and then blows off from the blowholes 76 to the intra-tank mixed liquor in the treatment tank 21.

This diffused air aerates the intra-tank mixed liquor and also produces an upstream of gas-liquid-solid mixed phase. The upstream stirs the intra-tank mixed liquor and supplies the intra-tank mixed liquor to the crossflow passage between plate-like membrane cartridges 26.

The controller 36 measures continuously the amount of wastewater flow based on the value obtained by the water level gauge 37, and performs flushing operation at a particular time that the amount of wastewater flow is below a predetermined value, or performs flushing operation at predetermined spaced-time intervals at which the timer is set.

In the flushing operation, the controller 36 opens the flushing valve 35 so that the air supplied from the blower 34 to the main pipe 74 of the diffuser tube 46 is allowed to pass through the flushing pipe 33 and come off under atmospheric pressure via an outlet 33a.

At this time, the outlet 33a is opened under atmospheric pressure at an upper position of the main pipe 74, and the blowholes 76 of the branch pipes 75 are opened at a lower position of the main pipe 74. As a result, the main flow of the air passing through the main pipe 74 of the diffuser tube 46 flows to the outlet 33a that has a smaller back pressure and a smaller resistance than the blowholes 76.

Therefore, the intra-tank mixed liquor passes through the blowholes 76 to the branch pipes 75 and the inside of the main pipe 74. The intra-tank mixed liquor running in the diffuser tube 46 flushes the sludge attached to the inside of the branch pipes 75 and the inside of the main pipe 74. This intra-tank mixed liquor is then joined with the air passing through the main pipe 74, to enter the flushing pipe 33 and come off together from the outlet 33a by air lift action.

By the same action as in the first preferred embodiment, pulsation occurs in the diffuser tube 46 and the flushing pipe 33. This produces intermittent occurrences of a flushing state that the intra-tank mixed liquor flows to the diffuser tube 46, and an air diffusion state that the flow of the intra-tank mixed liquor to the diffuser tube 46 is stopped and part of the air blows off via the blowholes 76.

At the point that the air diffusion state changes to the flushing state, a rapid flow of the intra-tank mixed liquor occurs in the diffuser tube 46. Repetitive occurrence of the rapid flow increases the effect of flushing the sludge attached to the inside of the diffuser tube 46.

Since the openings at the tip of the branch pipes 75 serve as the blowhole 76, the inner diameter of the branch pipes and the aperture of the blowhole 76 are the same. This provides a shape having no variations in the sectional area of the passage, so that there is no resistance to obstruct the fluid passing through the inside of the branch pipes 75 and blowholes 76 to the exterior. Therefore, the sludge and intra-tank mixed liquor that remain in the branch pipes 75 when changing from the flushing state to the air diffusion state, are quickly discharged to the outside of the branch pipes 75 during air diffusion.

In the flushing state, the intra-tank mixed liquor is joined with air to flow to the diffuser tube 46 and flushing pipe 33, and thus sufficient oxygen is dissolved in the intra-tank mixed liquor. Therefore, by returning the intra-tank mixed liquor discharged from the flushing pipe 33 to the treatment tank 21, the oxygen supply to the intra-tank mixed liquor and the stirring of the intra-tank mixed liquor are performable even in the flushing state.

Eighth Preferred Embodiment

An eighth preferred embodiment of the invention will be described based on FIG. 29. This embodiment discloses another construction of the air diffuser 24, which is applicable to the multistage immersion type membrane separator 22 of the first to sixth preferred embodiments. The same references have been used for similar parts which have the same functions as the seventh preferred embodiment, and their description is omitted. The followings are characteristic parts of the eighth preferred embodiment.

Figure 29:
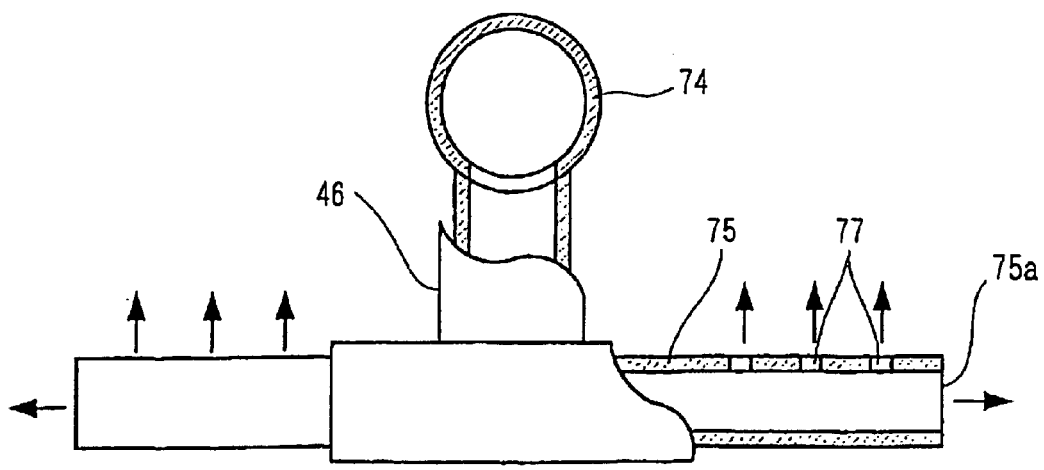
FIG. 29 is a front view, partially broken away, of an air diffuser according to still other preferred embodiment of the invention.

Referring to FIG. 29, a branch pipe 75 underlies a main pipe 74 in a diffuser tube 46. The branch pipe 75 has its both ends an opening 75a and has at its upper part a plurality of blowholes 77 having a smaller diameter than the opening 75a at the ends.

Operation in the above construction will be described below. Air diffusion operation and flushing operation are performed in the same manipulation in the seventh preferred embodiment.

During air diffusion operation, the air supplied from the blower 34 to the diffuser tube 46 passes through the main pipe 74 to each branch pipe 75 and blows off from the blowholes 77 to the intra-tank mixed liquor in the treatment tank 21.

That is, on receipt of buoyancy due to a density difference with the intra-tank mixed liquor, the air passing through the branch pipes 75 blows off from the blowholes 77. Since the blowholes 77 have a small aperture, the small bubbles of the diffused air have a small diameter, which increases the efficiency of oxygen dissolution. The improved efficiency of oxygen dissolution reduces the size of the blower 34 as an air source, thus permitting a reduction in power consumption.

In addition, even if the blowholes 77 are spontaneously clogged by sundry matter, sludge of low flowability, large flock and the like, the air blowing off from the openings 75a at the tip of the branch pipes 75 ensures a predetermined amount of air for aeration until the next flushing operation.

During flushing operation, the intra-tank mixed liquor passing through the openings 75a at the tips of the branch pipes 75 and the blowholes 77 to the branch pipes 75. This intra-tank mixed liquor is joined with air to pass through the branch pipes 75 to the main pipe 74 while flushing the inside of the diffuser tube 46, and it is then joined with cumulus deposit within the diffuser tube to come off together from the outlet 33a via the flushing pipe 33.

At this time, due to pulsation, the internal pressure in the diffuser tube 46 varies with repeated subjection to sharp increase and decrease, which provides repetitively rapid flow of the intra-tank mixed liquor to the branch pipes 75. As a result, the branch pipes 75, openings 75a and blowholes 77 are repetitively flushed for effective removal of sludge. This allows for a reduction in the aperture of the blowholes 77 of the branch pipes 75 that are liable to become clogged by dry sludge. Otherwise, the resulting effects are the same as the seventh preferred embodiment.

Ninth Preferred Embodiment

A ninth preferred embodiment of the invention will be described based on FIG. 30. This embodiment relates to a high-concentration wastewater treatment facility using a multistage immersion type membrane separator. To this embodiment, the multistage immersion type membrane separator 22 of the first to sixth preferred embodiments is applicable as a multistage immersion type membrane separator, and the air diffuser of the seventh or eighth preferred embodiment is applicable as an air diffuser. The same references have been used for similar parts in the multistage, immersion type membrane separator, and its description is omitted. The followings are characteristic parts of the ninth preferred embodiment.

Figure 30:
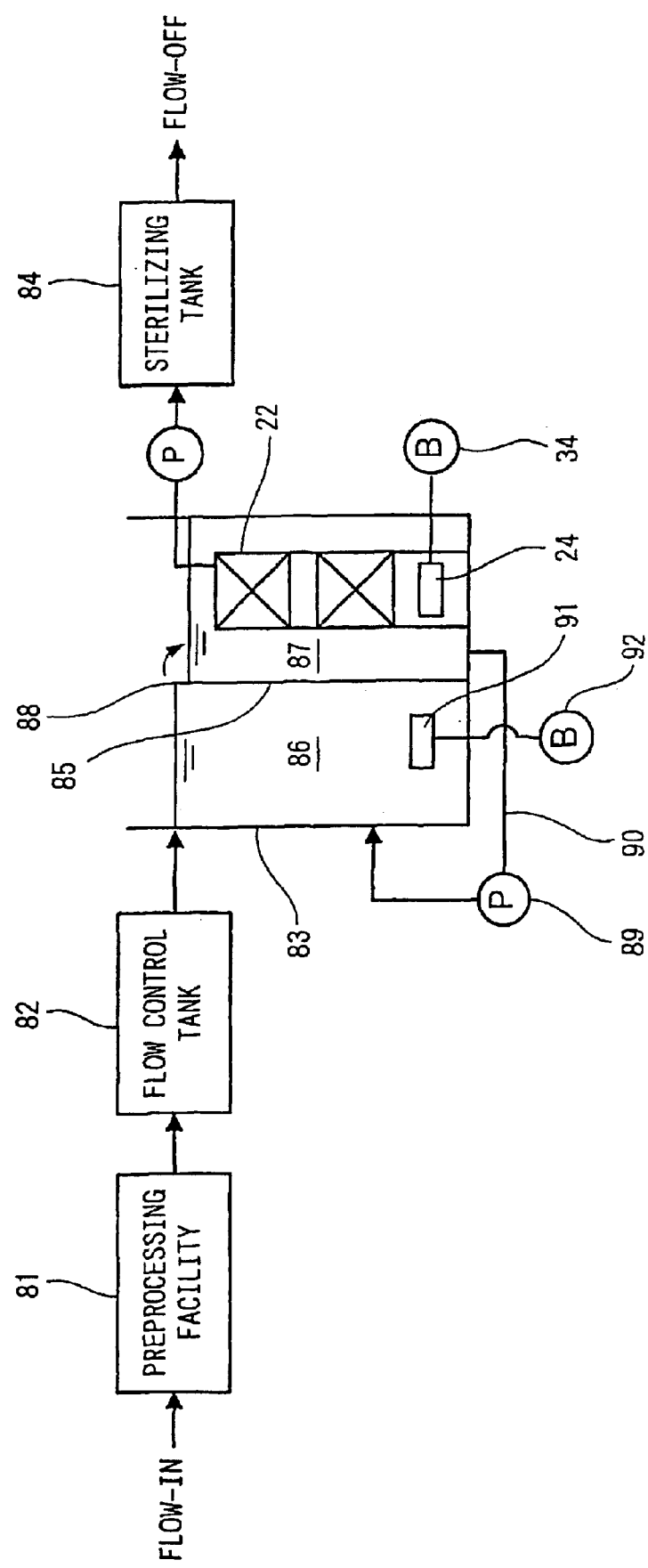
FIG. 30 is a schematic diagram of a high-concentration wastewater treatment facility using a multistage immersion type membrane separator according to still other preferred embodiment of the invention.

Referring to FIG. 30, in a preprocessing facility 81, sundry matter of an organic wastewater having high organic and nitrogen concentrations is removed and stored in a flow control tank 82. Thereafter, this is supplied from the flow control tank 82 to a bioremediation tank 83 at a fixed flow rate. In the bioremediation tank 83, organic material in the wastewater is decomposed and removed by activated sludge. The resulting matter is then subjected to liquid-solid separation in an immersion type membrane separator 22 immersed in the bioremediation tank 83, and the treated water is discharged after passing through a sterilizing tank 84.

The bioremediation tank 83 is divided by a partition wall 85 into a bioremediation region 86 to which wastewater flows, and a membrane separation region 87 in which the multistage immersion type membrane separator 22 is immersed.

The partition wall 85 is provided with an overflow weir 88 as a liquor transfer means for transferring an activated sludge mixed liquor from the bioremediation region 86 to the membrane separation region 87. Disposed between the regions 86 and 87 is a return conduit 90 having a sludge transfer pump 89 that is a liquor transfer means by which the concentrated sludge of the activated sludge mixed liquor concentrated in the membrane separation region 87 is transferred to the bioremediation region 86.

An air diffuser 24 of the multistage immersion type membrane separator 22 is placed as a first air diffuser 24 in the membrane separation region 87. A second air diffuser 91 is placed in the bioremediation region 86. Individual blowers 34 and 94 are independently connected to the first and second air diffusers 24 and 91, respectively.

Operation in the foregoing construction will be described below. The high-concentration organic wastewater running in the bioremediation tank 83 is subjected to activated sludge process while supplying oxygen from the air diffused from the first air diffuser 24 of the bioremediation region 86 and the second air diffuser 91 of the membrane separation region 87. At this time, the activated sludge mixed liquor of the bioremediation region 86 flows to the membrane separation region 87 via the overflow weir 88, and the activated sludge mixed liquor of the membrane separation region 87 is returned to the bioremediation region 86 via the return conduit 90 by the drive of the sludge transfer pump 89. From the membrane separation region 87, the concentrated sludge of 100 to 400% of the flow amount of the wastewater to be treated is returned to the bioremediation region 86.

In the membrane separation region 87, the active sludge process of the activated sludge mixed liquor is performed while supplying oxygen from the air diffused from the first air diffuser 24, and liquid-solid separation is performed by the multistage immersion type membrane separator 22, and then the transmitted liquor is transferred to the sterilizing tank 84.

Thus, the use of the multistage immersion type membrane separator 22 ensures a large amount of treatment under the limited volume of the bioremediation tank 83. In addition, an arbitrary amount of air can be supplied to the bioremediation tank 83 by independently controlling the amount of air diffused from the second air diffuser 91 while maintaining the amount of air diffused from the first air diffuser 24 at a predetermined amount suitable for flushing the membrane surfaces of the multistage immersion type membrane separator 22. This ensures a sufficient supply of oxygen necessary for the activated sludge process of the high-concentration organic wastewater running in the bioremediation tank 83. The resulting effects of the multistage immersion type membrane separator 22 and air diffuser 24 are the same as in the first to eighth preferred embodiments.

Tenth Preferred Embodiment

A tenth preferred embodiment of the invention will be described based on FIG. 31. This embodiment relates to a high-concentration wastewater treatment facility using a multistage immersion type membrane separator. To this embodiment, the multistage immersion type membrane separator 22 of the first to sixth preferred embodiments is applicable as a multistage immersion type membrane separator, and the air diffuser of the seventh or eighth preferred embodiment is applicable as an air diffuser. The same references have been used for similar parts in the multistage immersion type membrane separator, and its description is omitted. The same references have been used for similar parts which have the same operation as in the ninth preferred embodiment, and its description is omitted. The followings are characteristic parts of the tenth preferred embodiment.

Figure 31:
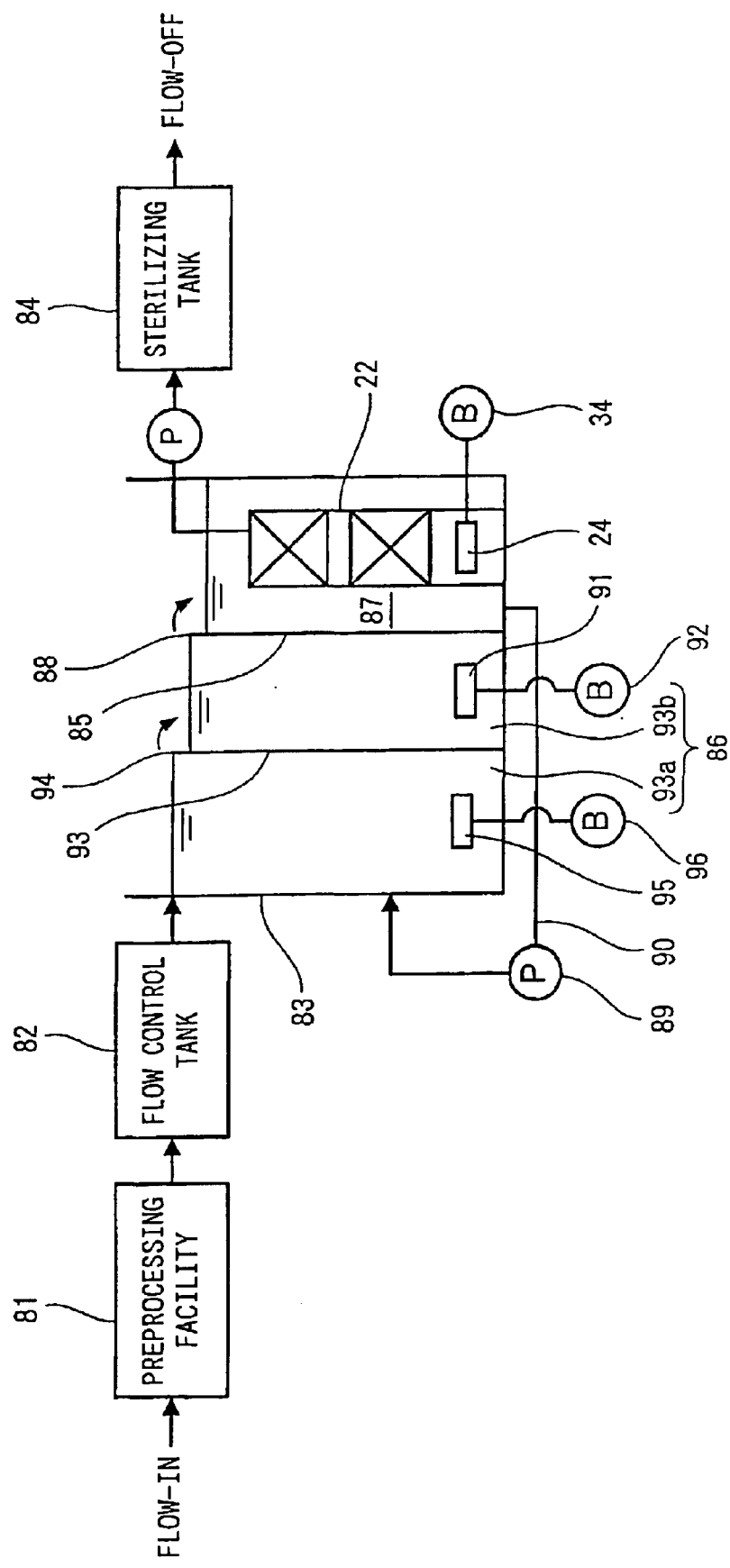
FIG. 31 a schematic diagram of a high-concentration wastewater treatment facility using a multistage immersion type membrane separator according to still other preferred embodiment of the invention.
Figure 32:
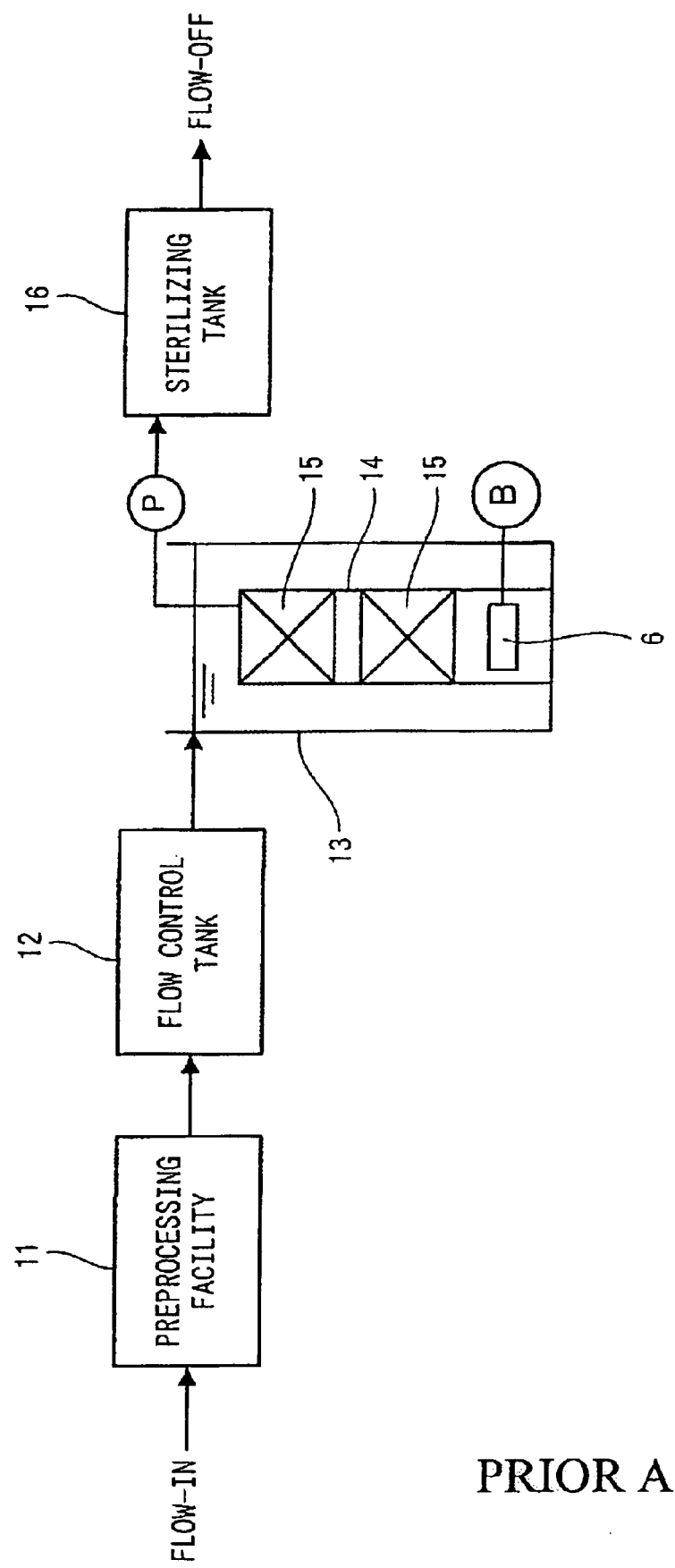
FIG. 32 is a schematic diagram of a conventional high-concentration wastewater treatment facility using a multistage immersion type membrane separator.
Figure 33:
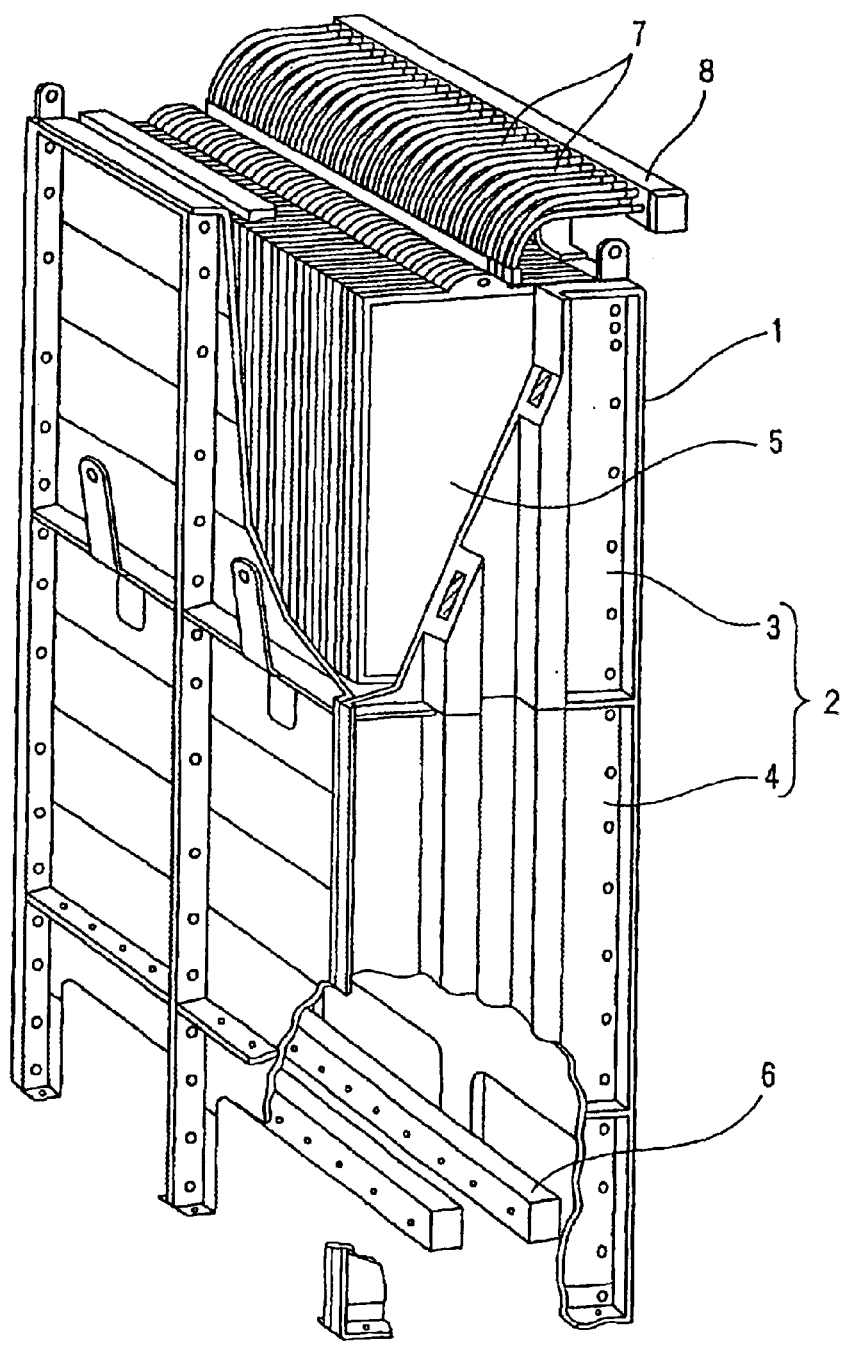
FIG. 33 is a perspective view of a conventional immersion type membrane separator.

Referring to FIG. 31, a bioremediation region 86 is divided by a second partition wall 93 into a front denitrification region 93a and a rear nitrification region 93b. The second partition wall 93 is provided with an overflow weir 94 as a liquor transfer means for transferring an activated sludge mixed liquor from the denitrification region 93a to the nitrification region 93b. Disposed between the regions 86 and 87 is a return conduit 90 having a sludge transfer pump 89 that is a liquor transfer means for transferring the concentrated sludge of the activated sludge mixed liquor concentrated in the membrane separation region 87 to the denitrification region 93a.

In the denitrification region 93a, a third air diffuser 95 is placed and a blower 96 is connected thereto. The third air diffuser 95 performs air diffusion as required. When air diffusion is performed, the amount of air diffused from the second air diffuser 91 and third air diffuser 95 is controlled such that the amount of oxygen supplied to the nitrification region 93*b* is three or more times the amount of oxygen supplied to the denitrification region 93*a*.

With this construction, by the drive of the sludge transfer pump 89, the concentrated sludge (nitrified liquor) of the membrane separation region 87 is returned via the return conduit 90 to the denitrification region 93*a* such that the organic materials of the wastewater are denitrified as a hydrogen donor.

It is generally necessary to maintain the denitrification region 93*a* in an anaerobic state that no oxygen supply is performed. However, it does not interfere with the treatment to perform aeration with less air while minimizing the oxygen supply amount, which aeration also aims at stirring the denitrification region 93*a*. Therefore, when the bioremediation tank 83 is susceptible to a deficiency of oxygen, an adequate amount of air is diffused from the third air diffuser 95. Specifically, there is no obstacle to denitrification when the amount of oxygen supply in the denitrification region 93*a* is one third or less that in the nitrification region 93*b*. From the membrane separation region 87, the concentrated sludge of 100 to 400% of the flow amount of the wastewater to be treated is returned to the denitrification region 93*a*.

In the nitrification region 93*b*, the active sludge mixed liquor of the denitrification region 93*a* that runs over the overflow weir 94 is nitrified while supplying oxygen from the air diffused from the second air diffuser 91. In the membrane separation region 87, the active sludge mixed liquor (nitrified liquor) from the overflow weir 88 is subjected to active sludge process while supplying oxygen from the air diffused from the first air diffuser 24. The resultant is then subjected to liquid-solid separation by the multistage immersion type membrane separator 22, so that the transmitted liquor is transferred to the sterilizing tank 84 and the concentrated sludge thus nitrified (nitrified liquor) is returned to the denitrification region 93*a* via the return conduit 90 by the drive of the sludge transfer pump 89. The resulting effects of the multistage immersion type membrane separator 22 and air diffuser 24 are the same as in the first to eighth preferred embodiments.

While the invention has been shown and described in detail, the foregoing description is in all aspects illustrative and not restrictive. It is therefore understood that numerous modifications and variations can be devised without departing from the scope of the invention.

What is claimed is:

1. A multistage immersion type membrane separator in which an air diffuser is disposed under a filtration part immersed in a treatment tank, characterized in that:

the filtration part has plural plate-like membrane cartridges arranged in a vertically parallel multistage fashion and spaced at intervals for forming a crossflow passage of a predetermined width;

the plate-like membrane cartridges have a filter supporting plate having rigidity on which a permeated water passage is formed, filtration membranes attached to front and rear of the filter supporting plate, and a permeated water outlet disposed at an upper portion on one side end surface of the filter supporting plate such that it is communicated to the permeated water passage and connected to a collecting means; and the air diffuser has a diffuser tube disposed sidewardly that has plural blowholes, a flushing pipe that has at its tip an opening serving as an outlet above the diffuser tube, and a flushing valve disposed in the flushing pipe wherein the diffuser tube is communicated at its basal end to an air supply source and at its front-end to the flushing pipe, a control means communicating with said flushing valve and said air supply source, and configured such that the flushing valve is opened while supplying air to the diffuser tube, thereby to cause the air supplied to the diffuser tube to pass through the flushing to be exhausted; a mixed liquor inside a treatment tank is caused to flow backward from the blowholes into the diffuser tube; the flowed mixed liquor is caused to be exhausted after passing through the flushing pipe together with the air as an air-liquid mixed flow; and pulsation caused by pressure fluctuations inside the pipe is utilized to repeat intermittent flushing.

2. The multistage immersion type membrane separator according to claim 1, wherein the filtration part has an open space between vertically adjacent plate-like membrane cartridges, and there is an inlet communicated to the open space and the surrounding intra-tank region.

3. The multistage immersion type membrane separator according to claim 2, wherein the filtration part has a skirt of a predetermined length surrounding a lower region of the plural plate-like membrane cartridges arranged in parallel, and there is an inlet under the skirt.

4. The multistage immersion type membrane separator according to claim 1, wherein the filtration part has plural filtration units arranged in a vertical multistage fashion, each unit having in its inner part plural plate-like membrane cartridges disposed in parallel and spaced at predetermined intervals between membrane surfaces of the plate-like membrane cartridges.

5. The multistage immersion type membrane separator according to claim 1, wherein the filtration part has plural filtration units arranged in a vertical multistage fashion, each unit being made up of plural plate-like membrane cartridges disposed in parallel and spaced at predetermined intervals, each plate-like membrane cartridge having, at a side edge portion of a filter supporting plate, a wall piece portion that makes contact with the side edge portion of the adjacent plate-like membrane cartridge to close a side opening of a crossflow passage.

6. The multistage immersion type membrane separator according to claim 1, wherein the diffuser tube is made up of a main pipe communicated at its basal end to an air supply source and communicated at a tip of the main pipe to a flushing pipe, and plural branch pipes being communicated to the main pipe and being opened at a tip of the plural branch pipes as a blowhole, below the main pipe.

7. The multistage immersion type membrane separator according to claim 1, wherein the diffuser tube is made up of a main pipe communicated at its basal end to an air supply source and communicated at a tip of the main pipe to a flushing pipe, and plural branch pipes being communicated to the main pipe and having at its upper side a plurality of blowholes of which diameter is smaller than that of the opening at a tip of the plural branch pipes.

8. A high-concentration wastewater treatment facility using a multistage immersion type membrane separator comprising:

the multistage immersion type membrane separator according to one of claims 1 to 7;

a treatment tank for performing bioremediation of organic wastewater that are high in organic concentration and nitrogen concentration;

a partition wall for dividing an intra-tank region of the treatment tank into a bioremediation region to which wastewater flows, and a membrane separation region in which the multistage immersion type membrane separator is immersed; and a liquor transfer means for transferring an activated sludge mixed liquor from the bioremediation region to the membrane separation region, the membrane separation region having a first air diffuser contained in the multistage immersion type membrane separator, and the bioremediation region having a second air diffuser.

9. The high-concentration wastewater treatment facility using a multistage immersion type membrane separator according to claim 8, further comprising:

a second partition wall for dividing a bioremediation region of a treatment tank into a front denitrification region and a rear nitrification region;

a second liquor transfer means for transferring an activated sludge mixed liquor from the bioremediation region to the nitrification region; and a third liquor transfer means for transferring an activated sludge mixed liquor from the membrane separation region to the denitrification region.

* * * * *